(12) United States Patent
Kim et al.

(10) Patent No.: US 10,222,664 B2
(45) Date of Patent: Mar. 5, 2019

(54) LIQUID CRYSTAL DISPLAY DEVICE

(71) Applicant: Samsung Display Co. Ltd., Yongin-si (KR)

(72) Inventors: Il Joo Kim, Hwaseong-si (KR); Cheol Gon Lee, Suwon-si (KR); Gun Woo Yang, Seoul (KR); Hyun Young Choi, Gwangju (KR); Tae Ho Kang, Incheon (KR); Chol Ho Kim, Suwon-si (KR); Hae Ryeong Park, Hwaseong-si (KR); Dong Il Yoo, Hwaseong-si (KR); Yong Woo Lee, Gimpo-si (KR); Mee Hye Jung, Suwon-si (KR); Joong Gun Chong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 99 days.

(21) Appl. No.: 15/346,424

(22) Filed: Nov. 8, 2016

(65) Prior Publication Data
US 2017/0322468 A1  Nov. 9, 2017

(30) Foreign Application Priority Data
May 3, 2016  (KR) .................... 10-2016-0054772

(51) Int. Cl.
*G02F 1/1333* (2006.01)
*G02F 1/1343* (2006.01)
(Continued)

(52) U.S. Cl.
CPC ...... *G02F 1/134336* (2013.01); *G02F 1/1368* (2013.01); *G02F 1/133345* (2013.01);
(Continued)

(58) Field of Classification Search
CPC ......... G02F 1/134336; G02F 1/133345; G02F 1/136227
(Continued)

(56) References Cited

U.S. PATENT DOCUMENTS 6,411,346 B1  6/2002 Numano et al.
8,654,268 B2  2/2014 Tsubata
(Continued)

FOREIGN PATENT DOCUMENTS

KR  1020060003609  1/2006
KR  1020130034700  4/2013
(Continued)

*Primary Examiner* — Lucy P Chien
(74) *Attorney, Agent, or Firm* — Cantor Colburn LLP

(57) ABSTRACT

A liquid crystal display device includes a substrate, a first coupling electrode disposed on the substrate, a first insulating layer disposed on the first coupling electrode, a second coupling electrode disposed on the first insulating layer and capacitively coupled to the first coupling electrode, a second insulating layer disposed on the second coupling electrode, and a pixel electrode including first and second sub-pixel electrodes, which are disposed on the second insulating layer and are electrically insulated from each other, where the first sub-pixel electrode is electrically connected to the first coupling electrode via a first contact hole, which is defined in the first and second insulating layers, and the second sub-pixel electrode is electrically connected to the second coupling electrode via a second contact hole which is defined in the second insulating layer.

22 Claims, 24 Drawing Sheets

(51) Int. Cl.
*G02F 1/1362* (2006.01)
*G02F 1/1368* (2006.01)

(52) U.S. Cl.
CPC .. *G02F 1/136227* (2013.01); *G02F 1/136286* (2013.01); *G02F 2001/134345* (2013.01); *G02F 2201/123* (2013.01); *G02F 2201/40* (2013.01)

(58) Field of Classification Search
USPC ........................................................ 349/141
See application file for complete search history.

(56) References Cited

U.S. PATENT DOCUMENTS

2006/0119758 A1* 6/2006 Chai ................ G02F 1/134309
349/43
2010/0118236 A1* 5/2010 Kim .................. G02F 1/133512
349/106

FOREIGN PATENT DOCUMENTS

| KR | 101545639 | 8/2015 |
|----|-----------|--------|
| KR | 1020150101058 | 9/2015 |
| KR | 1020150105528 | 9/2015 |
| KR | 1020150114638 | 10/2015 |

* cited by examiner

LIQUID CRYSTAL DISPLAY DEVICE

This application claims priority to Korean Patent Application No. 10-2016-0054772 filed on May 3, 2016, and all the benefits accruing therefrom under 35 U.S.C. § 119, the content of which in its entirety is incorporated herein by reference.

BACKGROUND

1. Field

Exemplary embodiments of the invention relate to a liquid crystal display ("LCD") device.

2. Description of the Related Art

A liquid crystal display ("LCD") device, which is one of the most widely-used display devices, generally includes two substrates on which field-generating electrodes such as pixel electrodes and a common electrode are formed and a liquid crystal layer which is inserted between the two substrates. The LCD device displays an image by applying voltages to the field-generating electrodes to generate an electric field in the liquid crystal layer, which determines an orientation of liquid crystal molecules in the liquid crystal layer to adjust a polarization of an incident light.

An example of the LCD device is a vertical alignment ("VA")-mode LCD device, which aligns liquid crystal molecules such that long axes of the liquid crystal molecules are perpendicular to upper and lower panels in the absence of an electric field. The VA-mode LCD device has been highlighted due to its high contrast ratio and wide reference viewing angle. As used herein, the "reference viewing angle" denotes a viewing angle corresponding to a contrast ratio of 1:10 or a limited angle for brightness inversion between gray levels.

For the VA-mode LCD device, various techniques have been proposed to make a side visibility become as close as possible to a front visibility, including a technique for providing different transmittances by dividing each pixel electrode into two sub-pixel electrodes and providing different voltages to the two sub-pixel electrodes, respectively.

SUMMARY

To realize a vertical alignment ("VA")-mode liquid crystal display ("LCD") device and to respectively provide different voltages to two sub-pixel electrodes, a method in which two or more thin-film transistors ("TFTs") are used has been suggested. In this method, however, an aperture ratio of the VA-mode LCD device may be lowered due to a provision of a plurality of TFTs and a plurality of contact holes.

Exemplary embodiments of the invention provide an LCD device which secures a sufficiently high aperture ratio and at the same time, providing an improved visibility.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a liquid crystal display device. The liquid crystal display device includes a substrate, a first coupling electrode disposed on the substrate, a first insulating layer disposed on the first coupling electrode, a second coupling electrode disposed on the first insulating layer and capacitively coupled to the first coupling electrode, a second insulating layer disposed on the second coupling electrode, and a pixel electrode including first and second sub-pixel electrodes, which are disposed on the second insulating layer and are electrically insulated from each other, where, the first sub-pixel electrode is electrically connected to the first coupling electrode via a first contact hole, which is defined in the first and second insulating layers, and the second sub-pixel electrode is electrically connected to the second coupling electrode via a second contact hole, which is defined in the second insulating layer.

According to another exemplary embodiment of the invention, there is provided a liquid crystal display device. The liquid crystal display device includes a substrate, a first coupling electrode disposed on the substrate, a first insulating layer disposed on the first coupling electrode, a second coupling electrode disposed on the first insulating layer and capacitively coupled to the first coupling electrode, a second insulating layer disposed on the second coupling electrode, and a pixel electrode including first and second sub-pixel electrodes, which are disposed on the second insulating layer and are electrically insulated from each other, where, the first sub-pixel electrode is electrically connected to the second coupling electrode via a first contact hole, which is defined in the second insulating layer; and the second sub-pixel electrode is electrically connected to the first coupling electrode via a second contact hole, which is defined in the first and second insulating layers.

According to the exemplary embodiments, an LCD device which secures a sufficiently high aperture ratio and at the same time, providing an improved visibility may be provided.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
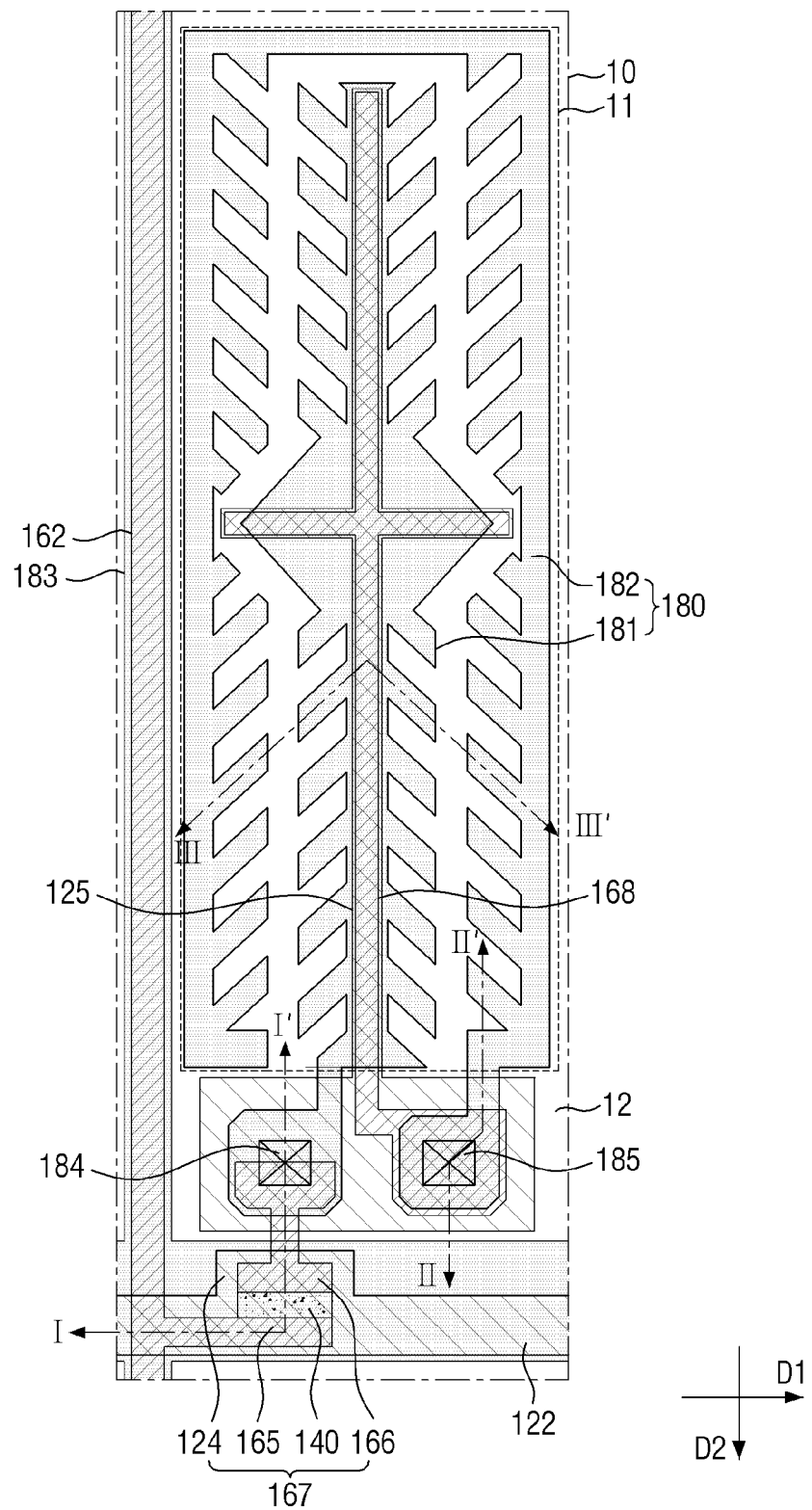
FIG. 1 is a plan view of an exemplary embodiment of a pixel of a liquid crystal display ("LCD") device according to the invention.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the present invention will be described in detail with reference to the accompanying drawings.

Figure 2:
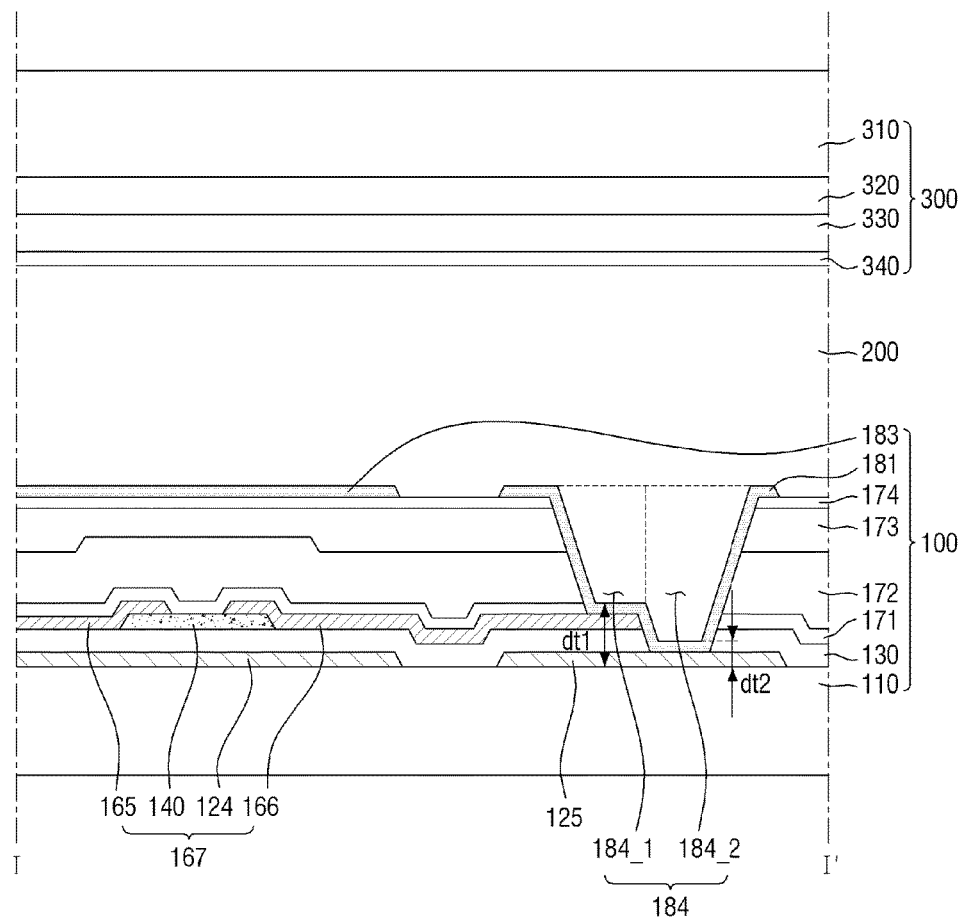
FIG. 2 is a cross-sectional view taken along line I-I' of FIG. 1.
Figure 3:
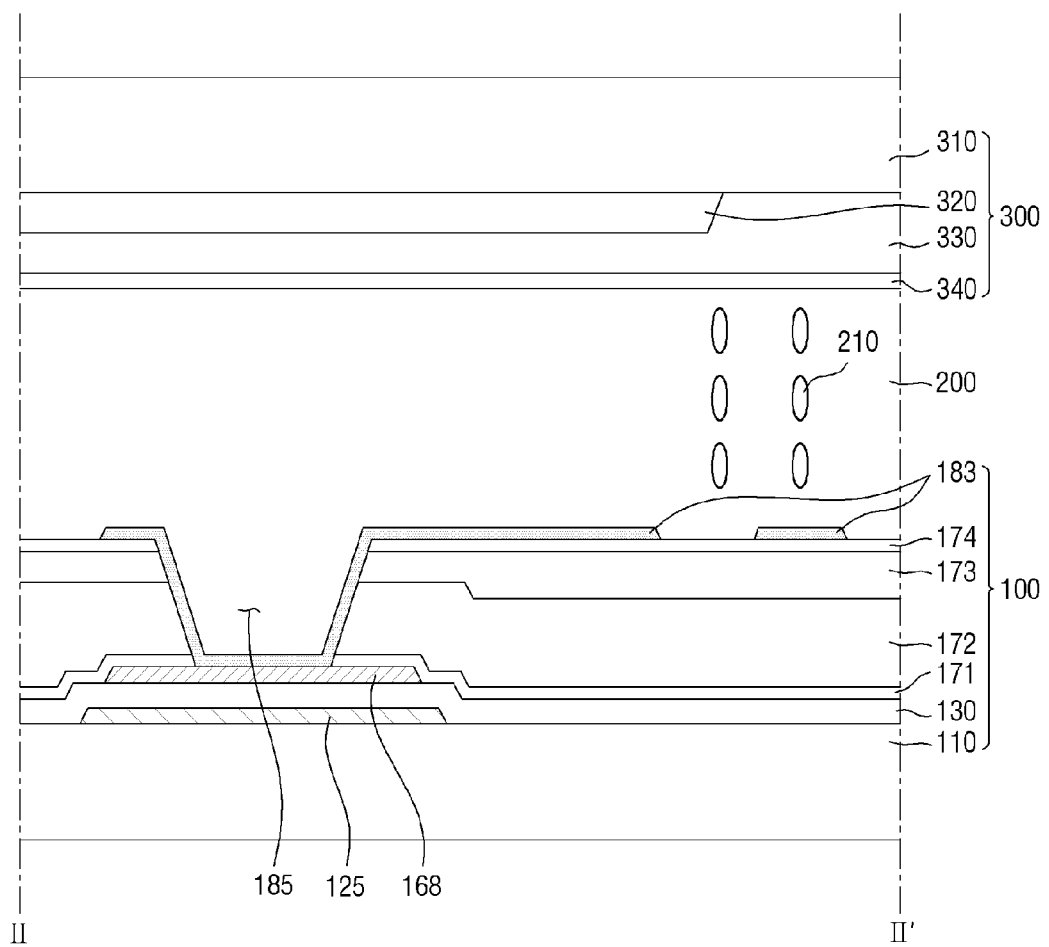
FIG. 3 is a cross-sectional view taken along line II-II' of FIG. 1.
Figure 4:
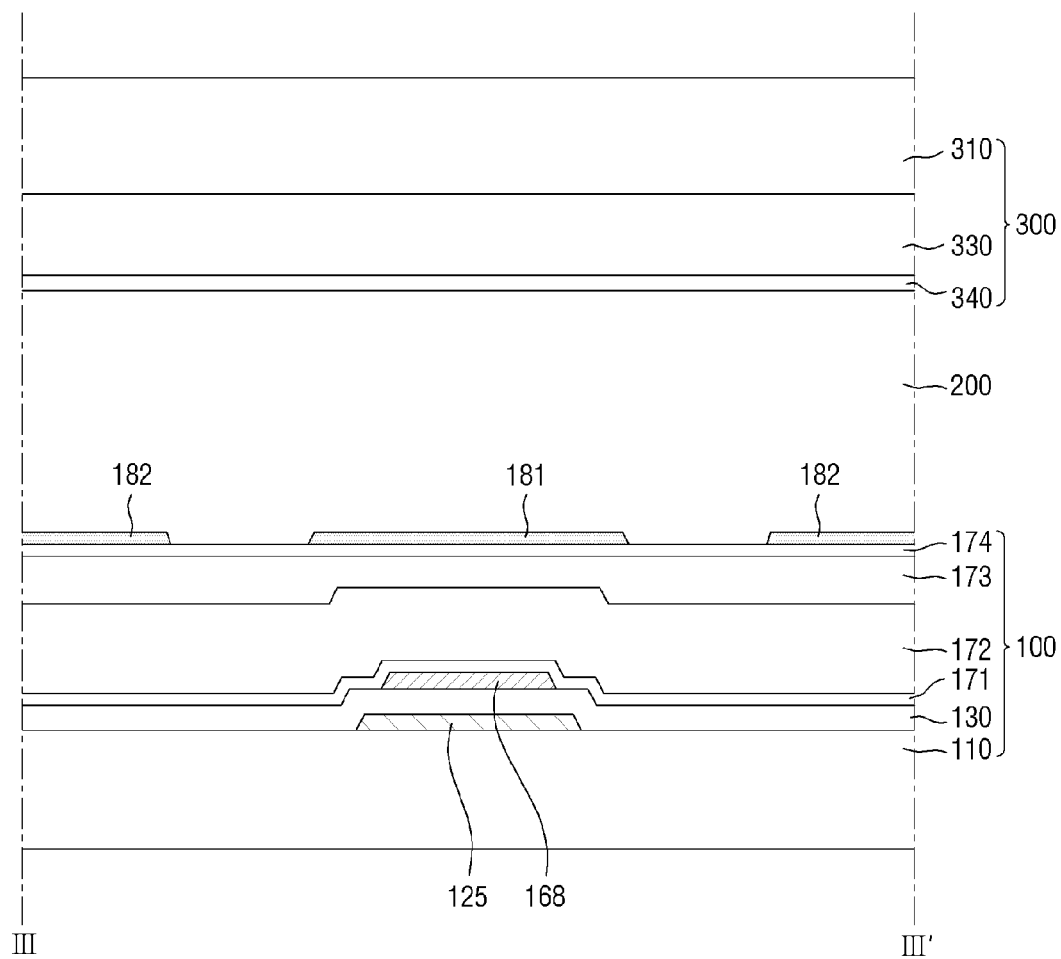
FIG. 4 is a cross-sectional view taken along line III-III' of FIG. 1.
Figure 5:
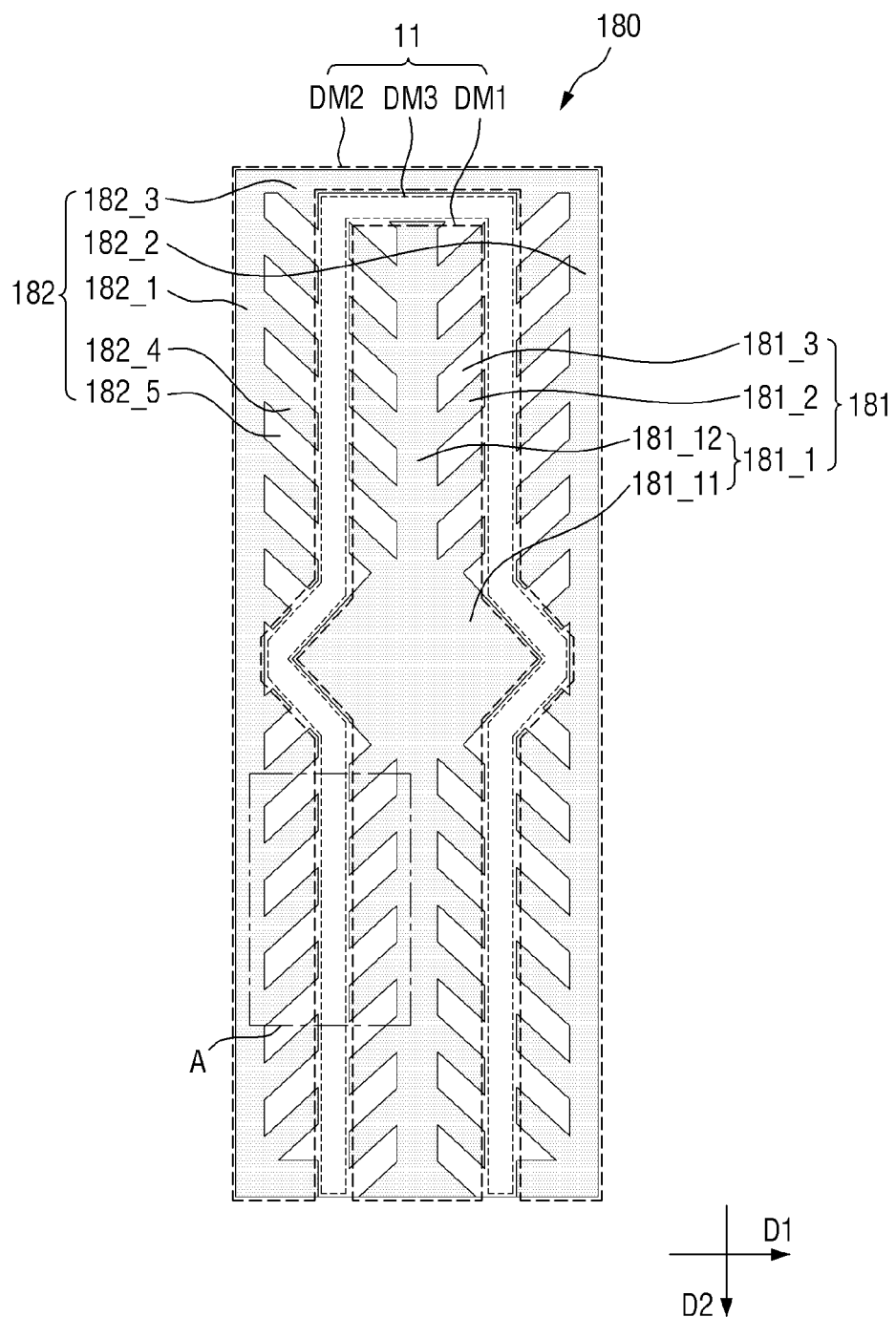
FIG. 5 is an enlarged plan view illustrating a pixel electrode of FIG. 1.

FIG. 1 is a plan view of a pixel of a liquid crystal display ("LCD") device according to an exemplary embodiment of the invention, FIG. 2 is a cross-sectional view taken along line I-I' of FIG. 1, FIG. 3 is a cross-sectional view taken along line II-II' of FIG. 1, FIG. 4 is a cross-sectional view taken along line III-III' of FIG. 1, and FIG. 5 is an enlarged plan view illustrating a pixel electrode of FIG. 1.

Referring to FIGS. 1 through 5, the LCD device according to the illustrated exemplary embodiment includes a first display substrate 100, a second display substrate 300, and a liquid crystal layer 200.

The first display substrate 100 may be a substrate on which a pixel electrode 180 and a thin-film transistor ("TFT") 167 are disposed. The TFT 167 may control a data voltage provided to the pixel electrode 180. The second display substrate 300 is a counter substrate disposed to face the first display substrate 100. The liquid crystal layer 200 includes liquid crystal molecules 210 and is interposed between the first and second display substrates 100 and 300.

The LCD device according to the exemplary embodiment includes at least one pixel 10, which is arranged in a matrix. The gray level of the pixel 10 may be independently controllable. The pixel 10 may be a basic unit for displaying a particular color. The pixel 10 includes a display region 11, which transmits light incident upon the bottom of the first display substrate 100 therethrough toward the top of the second display substrate 300 and displays an actual color, and a non-display region 12, which corresponds to a region other than the display region 11.

The first display substrate 100 will hereinafter be described.

The first display substrate 100 includes a first base substrate 110. In an exemplary embodiment, the first base substrate 110 may be a transparent insulating substrate. In an exemplary embodiment, the first base substrate 110 may be a glass substrate, a quartz substrate, or a transparent resin substrate, for example.

In some exemplary embodiments, the first base substrate 110 may be curved along a particular direction. In some other exemplary embodiments, the first base substrate 110 may have flexibility. That is, the first base substrate 110 may be deformable through rolling, folding, or bending.

A gate line 122, a gate electrode 124, and a first coupling electrode 125 are disposed on the first base substrate 110.

The gate line 122 transmits a gate signal Vgate, which controls the TFT 167 that will be described later in detail. The gate line 122 may extend in a first direction D1.

The first direction D1 may be a direction parallel to one side of the first base substrate 110 over a plane where the first base substrate 110 is disposed, and may be defined as a direction indicated by an arbitrary straight line extending from the left to the right of FIG. 1. However, the first direction D1 is not particularly limited to being parallel to one side of the first base substrate 110, but may be a direction indicated by a straight line extending across the first base substrate 100 in any particular direction.

The gate signal Vgate may be a signal having a variable voltage, provided by an external source. The turning on or off of the TFT 167 may be controlled by the voltage of the gate signal Vgate.

The gate electrode 124 may be provided to protrude from the gate line 122 and may be one of the elements that form the TFT 167.

The first coupling electrode 125 may overlap, and may thus be capacitively coupled to, a second coupling electrode 168 that will be described later. The first coupling electrode 125 may induce a voltage to be provided to the second coupling electrode 168. The first coupling electrode 125 may be electrically isolated from the gate electrode 124 or the gate line 122, and may not overlap the gate electrode 124 or the gate line 122.

Unlike the gate line 122 that extends passing by more than one pixel 10, the first coupling electrode 125 may be disposed in each pixel 10. The first coupling electrode 125 may be disposed in the display region 11 in the form of a cross and may be provided to have a predetermined area even on the outside of the display region 11 to be connected to the TFT 167.

The gate line 122, the gate electrode 124, and the first coupling electrode 125 may include the same material. In an exemplary embodiment, the gate line 122, the gate electrode 124, and the first coupling electrode 125 may include aluminum (Al), an Al-based metal such as an Al alloy, silver (Ag), a Ag-based metal such as a Ag alloy, copper (Cu), a Cu-based metal such as a Cu alloy, molybdenum (Mo), a Mo-based metal such as a Mo alloy, chromium (Cr), tantalum (Ta), titanium (Ti), or the like, for example. The gate line 122, the gate electrode 124, and the first coupling electrode 125 may have a single-layer structure or may have a multilayer structure including two conductive films having different physical properties.

Since the first coupling electrode 125 and the gate line 122 are provided in the same layer using the same material, no additional patterning or mask process may be desired. Thus, the manufacturing cost of the LCD device according to the exemplary embodiment may be minimized.

A gate insulating layer 130 is disposed on the gate line 122, the gate electrode 124, and the first coupling electrode 125. The gate insulating layer 130 may include an insulating material. In an exemplary embodiment, the gate insulating layer 130 may include silicon nitride or silicon oxide, for example. The gate insulating layer 130 may have a single-layer structure or may have a multilayer structure including two insulating films having different physical properties.

A semiconductor layer 140 is disposed on the gate insulating layer 130. The semiconductor layer 140 may at least partially overlap the gate electrode 124. In an exemplary embodiment, the semiconductor layer 140 may include amorphous silicon, polycrystalline silicon, or an oxide semiconductor, for example.

The semiconductor layer 140 may at least partially overlap the gate electrode 124 and may be at least partially overlapped by a source electrode 165 and a drain electrode 166 that will be described later. In the exemplary embodiment, the semiconductor layer 140 is disposed in and around an area where the gate electrode 124 is disposed, but may be disposed to cover a larger area than the area where the gate electrode 124 is disposed. More specifically, in a case in which the semiconductor layer 140, a data line 162, the source electrode 165, and the drain electrode 166 are provided using different masks, the semiconductor layer 140 may be provided only in and around the area where the gate electrode 124 is disposed. In a case in which the semiconductor layer 140 and the data line 162 are provided using the same mask, the semiconductor layer 140 may be disposed to be overlapped by all the data line 162, the source electrode 165, and the drain electrode 166.

Although not specifically illustrated, in exemplary embodiments, ohmic contact members may be additionally provided on the semiconductor layer 140. In an exemplary embodiment, the ohmic contact members may include n+ hydrogenated amorphous silicon doped with a high concentration of n-type impurities, or silicide, for example. The ohmic contact members may be disposed on the semiconductor layer 140 in a pair. The ohmic contact members, which are disposed among the source electrode 165, the drain electrode 166, and the semiconductor layer 140, may enable the source electrode 165, the drain electrode 166, and the semiconductor layer 140 to have ohmic contact properties. In a case in which the semiconductor layer 140 includes an oxide semiconductor, the ohmic contact members may not be provided.

The data line 162, the source electrode 165, the drain electrode 166, and the second coupling electrode 168 are disposed on the semiconductor layer 140 and the gate insulating layer 130.

The data line 162 may extend in a second direction D2 and may intersect the gate line 122.

The second direction D2 may be a direction that intersects the first direction D1 over the plane where the first substrate 110 is disposed, for example, a direction indicated by an arbitrary straight line extending from the top to the bottom of FIG. 1. In exemplary embodiments, the first and second directions D1 and D2 may cross each other at a right angle.

The data line 162 may be insulated from the gate line 122, the gate electrode 124, and the first coupling electrode 125 by the gate insulating layer 130.

The data line 162 may provide a data signal Vdata to the source electrode 165. The data signal Vdata may be a signal having a variable voltage, provided by an external source. The gray level of the pixel 10 may be controlled by the data signal Vdata.

The source electrode 165 may be branched off from the data line 162 and may at least partially overlap the gate electrode 124. The source electrode 165 may provide the data signal Vdata, which is provided by the data line 162, to the drain electrode 166 via the semiconductor layer 140.

The drain electrode 166 may be spaced apart from the source electrode 165, in a plan view, over the semiconductor layer 140 and may partially overlap the gate electrode 124. As illustrated in FIG. 1, the source electrode 165 may face the drain electrode 166 at a predetermined distance from the drain electrode 166, but the invention is not limited thereto. That is, in an alternative exemplary embodiment, the source electrode 165 may extend in a "U" shape and may surround the drain electrode 166.

The semiconductor layer 140 may be disposed in an area between the source electrode 165 and the drain electrode 166, which are spaced apart from each other. That is, the source electrode 165 and the drain electrode 166 may partially overlap or contact the semiconductor layer 140 and may face each other with the semiconductor layer 140 interposed therebetween.

The second coupling electrode 168 may form a coupling capacitor Cc by being capacitively coupled to the first coupling electrode 125. That is, in an area where the first and second coupling electrodes 125 and 168 are disposed to overlap each other, the coupling capacitor Cc may have the gate insulating layer 130, which is disposed between the first and second coupling electrodes 125 and 168, as a dielectric body. A predetermined percentage of the voltage provided to the first coupling electrode 125 may be induced to the second coupling electrode 168. The second coupling electrode 168 may be provided to overlap the first coupling electrode 125. The larger the overlapping area between the first and second coupling electrodes 125 and 168 is, the higher the capacitance of the coupling capacitor Cc, which is provided between the first and second coupling electrodes 125 and 168 is.

The higher the capacitance of the coupling capacitor Cc, the more similar the voltage generated in the first coupling electrode 125 to the voltage generated in the second coupling electrode 168. The lower the capacitance of the coupling capacitor Cc is, the larger the difference between the voltage generated in the first coupling electrode 125 and the voltage generated in the second coupling electrode 168 is.

By controlling the capacitance of the coupling capacitor Cc, the ratio of the voltage applied to a first sub-pixel electrode 181 and the voltage applied to a second sub-pixel electrode 182 may be controlled, and this will be described later in detail with reference to FIG. 8.

The second coupling electrode 168 may be disposed in the display region 11 in the form of a cross. As mentioned above, the first coupling electrode 125 may also be disposed in the display region 11 in the form of a cross. Thus, the first and second coupling electrodes 125 and 168 may overlap each other, forming the shape of a cross in the display region 11.

The data line 162, the source electrode 165, the drain electrode 166, and the second coupling electrode 168 may include the same material. In an exemplary embodiment, the data line 162, the source electrode 165, the drain electrode 166, and the second coupling electrode 168 may include Al, Cu, Ag, Mo, Cr, Ti, Ta or an alloy thereof, for example. The data line 162, the source electrode 165, the drain electrode 166, and the second coupling electrode 168 may have a multilayer structure including a lower film including a refractory metal and a low-resistance upper film disposed on the lower film, but the invention is not limited thereto.

Due to the aforementioned structure of the pixel electrode 180, a cross-shaped dark area may be provided in the middle of the display region 11. The first and second coupling electrodes 125 and 168, which are cross-shaped, may be disposed to overlap the cross-shaped dark area. Thus, any decrease in the transmittance of the display region 11 that may occur due to the presence of the first and second coupling electrodes 125 and 168, which include an opaque conductive material, may be minimized.

The gate electrode 124, the semiconductor layer 140, the source electrode 165, and the drain electrode 166 may form the TFT 167. The TFT 167 may be disposed in the pixel 10, particularly, in the region other than the display region 11.

The input terminal of the TFT 167 may correspond to the source electrode 165, the output terminal of the TFT 167 may correspond to the drain electrode 166, and the control terminal of the TFT 167 may correspond to the gate electrode 124.

Since the second coupling electrode 168 and the data line 162 are provided in the same layer using the same material, no additional patterning or mask process may be desired. Thus, the manufacturing cost of the LCD device according to the exemplary embodiment may be minimized.

A first passivation layer 171 is disposed on the data line 162, the TFT 167, and the second coupling electrode 168. The first passivation layer 171 may include an inorganic insulating material. The first passivation layer 171 may be disposed to cover the data line 162, the TFT 167, and the second coupling electrode 168. The first passivation layer 171 may protect the data line 162, the TFT 167, and the second coupling electrode 168 from elements disposed thereon.

A color filter layer 172 is disposed on the first passivation layer 171. In an exemplary embodiment, the color filter layer 172 may include a photosensitive organic composition including a pigment for realizing a color, and the pigment may include any one of red, green, and blue pigments, for example. In an exemplary embodiment, the color filter layer 172 may include a plurality of color filters, for example. In an exemplary embodiment, each of the plurality of color filters may display any one of a number of primary colors such as red, green, and blue, for example, but the invention is not limited thereto. That is, in another example, each of the plurality of color filters may display any one of cyan, magenta, yellow, and white colors, for example.

A planarization layer 173 is disposed on the color filter layer 172. The planarization layer 173 may planarize any regional height difference generated by elements disposed between the planarization layer 173 and the first base substrate 110.

A second passivation layer 174 is disposed on the planarization layer 173. In an exemplary embodiment, the second passivation layer 174 may include an inorganic insulating material such as silicon oxide, silicon nitride, or silicon oxynitride. The second passivation layer 174 may suppress the liquid crystal layer 200 from being contaminated with an organic material such as a solvent from the planarization layer 173 and the color filter layer 172. Accordingly, defects such as image sticking that may occur during the driving of the LCD device according to the exemplary embodiment may be prevented. In exemplary embodiments, the second passivation layer 174 may not be provided.

The pixel electrode 180 and a shielding electrode 183 are disposed on the second passivation layer 174.

The pixel electrode 180 includes a first sub-pixel electrode 181 and a second sub-pixel electrode 182, which are electrically insulated from each other. The first and second sub-pixel electrodes 181 and 182 may be disposed in each pixel 10 in a pair. Also, the first and second sub-pixel electrodes 181 and 182 may be provided in the same layer using the same material. The first and second sub-pixel electrodes 181 and 182 may be disposed not to overlap each other.

The first sub-pixel electrode 181 may be physically connected to the drain electrode 166 and the first coupling electrode 125 via a first contact hole 184, which penetrates the gate insulating layer 130, the first passivation layer 171, the color filter layer 172, the planarization layer 173, and the second passivation layer 174, and may thus be provided with the data signal Vdata from the drain electrode 166. The data signal Vdata provided from the drain electrode 166 may be provided to the first coupling electrode 125 via the first sub-pixel electrode 181, which is disposed in the first contact hole 184. Consequently, the data signal Vdata provided to the drain electrode 166 may be provided to both the first sub-pixel electrode 181 and the first coupling electrode 125.

The first contact hole 184 may be defined in the non-display region 12 of each pixel 10. Since the first contact hole 184 connects three conductive materials disposed in different layers, the depth of the first contact hole 184 may vary from one portion to another portion of the first contact hole 184. That is, the first contact hole 184 includes a first height portion 184_1 having a first height dt1 from the top surface of the first base substrate 110 to the top surface of the first sub-pixel electrode 181 disposed in the first contact hole 184 and a second height portion 184_2 having a second height dt2 from the top surface of the first base substrate 110 to the top surface of the sub-pixel electrode 181 disposed in the first contact hole 184. The second height dt2 may be smaller than the first height dt1.

More specifically, the first height portion 184_1 may penetrate the gate insulating layer 130, the first passivation layer 171, the color filter layer 182, the planarization layer 183, and the second passivation layer 174 and may thus expose the first coupling electrode 125. The second height portion 184_2 may penetrate the first passivation layer 171, the color filter layer 172, the planarization layer 173, and the second passivation layer 174 and may thus expose the drain electrode 166. The first coupling electrode 125 and the drain electrode 166, which are exposed by the first and second height portions 184_1 and 184_2, respectively, may be physically and electrically connected by the first sub-pixel electrode 181. More specifically, the output terminal of the TFT 167, i.e., the drain electrode 166, and the first sub-pixel electrode 181 may contact each other in the first height portion 184_1, and the first coupling electrode 125 and the first sub-pixel electrode 181 may contact each other in the second height portion 184_2. The first sub-pixel electrode 181 may extend from the first height portion 184_1 to the second height portion 184_2.

The second sub-pixel electrode 182 may be physically and electrically connected to the second coupling electrode 168 via a second contact hole 185, which penetrates the first passivation layer 171, the color filter layer 172, the planarization layer 173, and the second passivation layer 174, and may thus receive a voltage generated in the second coupling electrode 168. The voltage provided to the second coupling electrode 168 may be a voltage induced to the second coupling electrode 168 by the coupling capacitor Cc provided between the first and second coupling electrodes 125 and 168.

The second contact hole 185 may be defined in the non-display region 12 of each pixel 10.

The second contact hole 185 may be defined to be spaced apart from and overlap the second coupling electrode 168 with the gate insulating layer 130 interposed therebetween. The first coupling electrode 125 is disposed below the second contact hole 185. Thus, in a case in which the second contact hole 185 overlaps the second coupling electrode 168, the first and second coupling electrodes 125 and 168 may overlap each other. Accordingly, by using the area in which the second contact hole 185 is defined, the capacitance of the coupling capacitor Cc may be easily secured.

The first sub-pixel electrode 181 includes a first stem electrode 181_1 and a plurality of first branch electrodes 181_2. The first stem electrode 181_1 may extend from the display region 11 along the second direction D2. The first branch electrodes 181_2 may extend from the first stem electrode 181_1 along a diagonal direction with respect to the first or second direction D1 or D2.

First minute slits 181_3 are disposed among the first branch electrodes 181_2, which are disposed in parallel to one another. The first minute slits 181_3 may be openings in which no transparent conductive material is provided. The first minute slits 181_3 are disposed among the first branch electrodes 181_2, which are parallel to one another, and may thus extend in the same direction as the first branch electrodes 181_2.

The first stem electrode 181_1 includes a first stem expanded portion 181_11 and a first stem extension 181_12.

In an exemplary embodiment, the first stem expanded portion 181_11 may be disposed at the center of the first stem electrode 181_1, particularly, at the center of the display region 11, and may be provided in a rhombus shape, for example. Since the first stem expanded portion 181_11 is located at the center of the display region 11 and is rhombus-shaped, for example, similar levels of influence may be exerted on the liquid crystal molecules 210 on the sides of the first stem expanded portion 181_11 when the liquid crystal molecules 210 are tilted toward the center of the first stem expanded portion 181_11. Accordingly, the formation of a cross-shaped dark area at the center of the display region 11 may be minimized.

The first stem extension 181_12 may extend from both sides of the first stem expanded portion 181_11 along the second direction D2. Most of the first branch electrodes 181_2 may extend from the first stem extension 181_12 and may have a smaller width than the first stem expanded portion 181_11.

The second sub-pixel electrode 182 includes a second stem electrode 182_1, a third stem electrode 182_2, a fourth stem electrode 182_3, and a plurality of second branch electrodes 182_4.

The second and third stem electrodes 182_1 and 182_2 may extend from the display region 11 along the second direction D2. Unlike the first stem electrode 181_1 extending in the second direction D2 passing through the center of the display region 11, the second and third stem electrodes 182_1 and 182_2 may extend in the second direction D2 along the outer sides of the display region 11. In an exemplary embodiment, referring to the plan view of FIG. 5, the second stem electrode 182_1 may extend in the second direction D2 along the left side of the display region 11, and the third stem electrode 182_2 may extend in the second direction D2 along the right side of the display region 11, for example.

The fourth stem electrode 182_3 may extend along the first direction D1 in the display region 11 and may not be physically connected to the second and third stem electrodes 182_1 and 182_2. The fourth stem electrode 182_3 is disposed not to overlap the first sub-pixel electrode 181 and may extend in the first direction D1 along an outer side of the display region 11. In an exemplary embodiment, referring to the plan view of FIG. 5, the fourth stem electrode 182_3 may extend in the first direction D1 along the top side of the display region 11, for example.

The second branch electrodes 182_4 may extend from the second or third stem electrode 182_1 or 182_2 along a diagonal direction with respect to the first or second direction D1 or D2. In the exemplary embodiment, the second branch electrodes 182_4 do not extend from the fourth stem electrode 182_3, but the invention is not limited thereto. That is, when necessary, the second branch electrodes 182_4 may also be configured to extend even from the fourth stem electrode 182_3.

Since the second, third, and fourth stem electrodes 182_1, 182_2, and 182_3 are disposed along the sides of the display region 11, the second branch electrodes 182_4 may extend substantially toward the center of the display region 11. Accordingly, the second branch electrodes 182_4 may be disposed to be spaced apart from and face the first branch electrodes 181_2, respectively, which extend from the first stem electrode 181_1. The second branch electrodes 182_4 may be disposed on the extension lines of the first branch electrodes 181_2, respectively. The width of the first branch electrodes 181_2 in a direction perpendicular to the direction in which the first branch electrodes 181_2 extend may be the same as the width of the second branch electrodes 182_4 in a direction perpendicular to the direction in which the second branch electrodes 182_4 extend.

Second minute slits 182_5 are disposed among the second branch electrodes 182_4, which are disposed in parallel to one another. The second minute slits 182_5 may be openings in which no transparent conductive material is provided. The second minute slits 182_5 are disposed among the second branch electrodes 182_4, which are parallel to one another, and may thus extend in the same direction as the second branch electrodes 182_4.

As mentioned above, the first and second sub-pixel electrodes 181 and 182 are disposed not to overlap each other. Thus, the display region 11 may be divided into three regions, i.e., a first domain region DM1 in which the first sub-pixel electrode 181 is disposed, a second domain region DM2 in which the second sub-pixel electrode 182 is disposed, and a third domain region DM3 which is a region between the first and second domain regions DM1 and DM2. The first domain region DM1 may be disposed in the middle of the display region 11 and may substantially extend in the second direction D2, the second domain region DM2 may surround the first domain region DM1, and the third domain region DM3 may surround the second domain region DM2.

As mentioned above, the first sub-pixel electrode 181 is provided with a voltage directly from the drain electrode 166, and the second sub-pixel electrode 182 is provided with a voltage induced by the first and second coupling electrodes 125 and 168. Thus, the voltage provided to the first sub-pixel electrode 181 and the voltage provided to the second sub-pixel electrode 182 may differ from each other. Accordingly, a relatively strong electric field may be generated in the first domain region DM1, and a relatively weak electric field may be generated in the second domain region DM2. Since no particular conductive material is provided in the third domain region DM3, an electric field weaker than those generated in the first and second domain regions DM1 and DM2 may be generated in the third domain region DM3. As a result, a strongest electric field is generated in the first domain region DM1, and a weakest electric field is generated in the third domain region DM3. Since electric fields with various intensities may be generated in the display region 11, the visibility of the LCD device according to the exemplary embodiment may be improved. The behavior of the liquid crystal molecules 210 in accordance with the electric fields generated in the first, second, and third domain regions DM1, DM2, and DM3, respectively, will be described later in detail with reference to FIGS. 6 and 7.

The shielding electrode 183 may be disposed in the same layer as that in which the pixel electrode 180 is disposed, and may include the same material as that of the pixel electrode 180. The shielding electrode 183 may be disposed not to overlap the pixel electrode 180 and may be electrically insulated from the pixel electrode 180.

The shielding electrode 183 may be in a floating state, i.e., a state in which no particular voltage is provided from an external source, but the invention is not limited thereto. That is, in an alternative exemplary embodiment, the shielding electrode 183 may be provided with a voltage having a uniform level, for example, a common voltage.

The shielding electrode 183 may be disposed to overlap mostly the data line 162. As mentioned above, the data signal Vdata is provided to the data line 162. Since the voltage of the data signal Vdata tends to change frequently and considerably, the liquid crystal molecules 210 may be aligned in an unintended direction under the influence of the data signal Vdata, and this problem may be addressed by the shielding electrode 183.

The shielding electrode 183 is disposed to overlap not only the data line 172, but also the gate line 122 and the TFT 167. Portions of the shielding electrode 183 overlapping the gate line 122 and the TFT 167, like a portion of the shielding electrode 183 overlapping the data line 172, may prevent a misalignment of the liquid crystal molecules 210.

A first alignment layer (not illustrated) may be disposed on the pixel electrode 180 and the shielding electrode 183. The first alignment layer may control an initial alignment angle of the liquid crystal molecules 210 in the liquid crystal layer 200.

The second display substrate 300 will hereinafter be described.

The second display substrate 300 may include a second base substrate 310, a light-shielding member 320, an overcoat layer 330, and a common electrode 340.

The second base substrate 310 may be disposed to face the first base substrate 110. The second base substrate 310 may be durable enough to withstand external shock. The second base substrate 310 may be a transparent insulating substrate. In an exemplary embodiment, the second base substrate 310 may be a glass substrate, a quartz substrate, a transparent resin substrate, or the like, for example. The second base substrate 310 may be in the shape of a flat plate, or may be curved in a particular direction.

The light-shielding member 320 is disposed on a surface of the second base substrate 310 that faces the first display substrate 100. The light-shielding member 320 may be disposed to overlap the gate line 122, the data line 162, the first coupling electrode 125, the second coupling electrode 168, the TFT 167, the first contact hole 184, and the second contact hole 185. In other words, the light-shielding member 320 may be disposed to overlap almost the entire region other than the display region 11, and may block the transmission of light in the region other than the display region 11.

The overcoat layer 330 is disposed on a surface of the light-shielding member 320 that faces the first display substrate 100. The overcoat layer 330 may reduce any height difference generated by the light-shielding member 320. In other words, a surface of the overcoat layer 330 that faces the first display substrate 100 may be substantially flat. In exemplary embodiments, the overcoat layer 330 may not be provided.

In exemplary embodiments, the color filter layer 172 may be disposed between the light-shielding member 320 and the overcoat layer 330. That is, the color filter layer 172 may be provided in the second display substrate 300, instead of being provided in the first display substrate 100. In these exemplary embodiments, the overcoat layer 330 may reduce any height difference generated by the light-shielding member 320 and the color filter layer 172.

The common electrode 340 is disposed on the overcoat layer 330. In an exemplary embodiment, the common electrode 340 may include a transparent conductive material such as indium tin oxide ("ITO"), indium zinc oxide ("IZO"), indium tin zinc oxide ("ITZO"), or aluminum-doped zinc oxide ("AZO"). The common electrode 340 may be disposed on the entire surface of the second base substrate 310. A common signal provided by an external source, for example, a common voltage, may be applied to the common electrode 340, and the common electrode 340 may generate an electric field together with the pixel electrode 180.

A second alignment layer (not illustrated) may be disposed on the common electrode 340. The second alignment layer may perform similar functions to the first alignment layer. That is, the second alignment layer may control the initial alignment of the liquid crystal molecules 210 in the liquid crystal layer 200.

The liquid crystal layer 200 will hereinafter be described.

The liquid crystal layer 200 includes the liquid crystal molecules 210, which have dielectric anisotropy and refractive anisotropy. The liquid crystal molecules 210 may be aligned substantially vertically with respect to the surfaces of the first and second display substrates 100 and 300 in the absence of an electric field in the liquid crystal layer 200. In response to an electric field being generated between the first and second display substrates 100 and 300, the liquid crystal molecules 210 may rotate in a particular direction, or may be tilted, between the first and second display substrates 100 and 300, thereby changing the polarization of light.

The improvement of visibility will hereinafter be described with reference to FIGS. 6 and 7.

Figure 6:
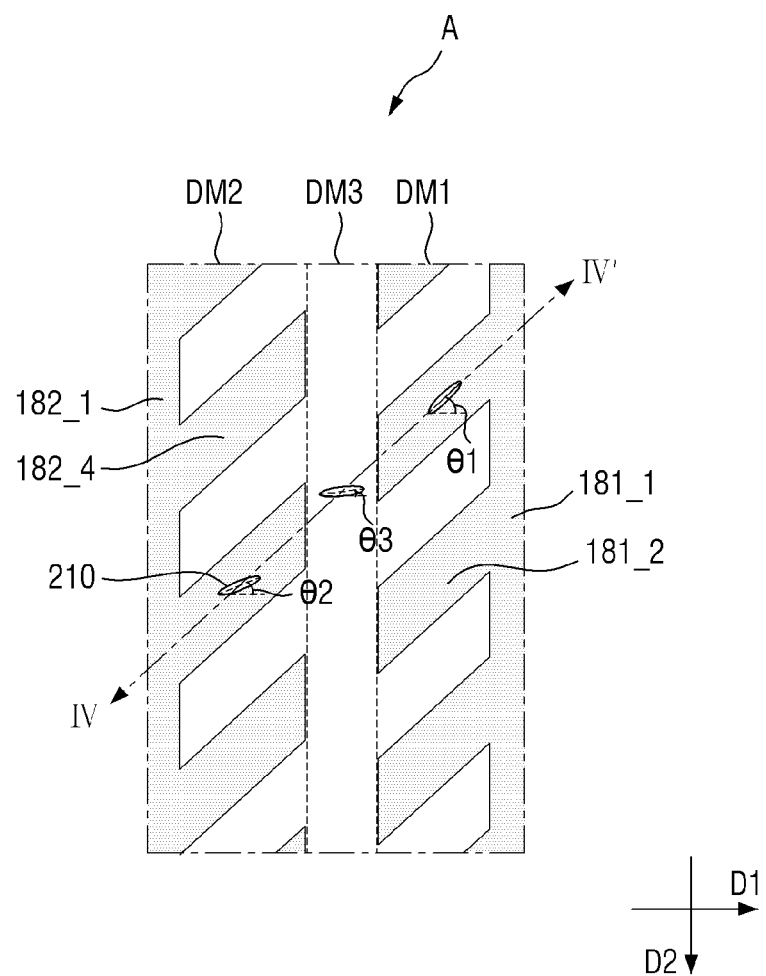
FIG. 6 is an enlarged plan view illustrating an area A of FIG. 5.

FIG. 6 is an enlarged plan view of an area A of FIG. 5.

More specifically, FIG. 6 illustrates a direction in which the liquid crystal molecules 210 in the area A are tilted in a state in which a predetermined voltage is provided to the first and second sub-pixel electrodes 181 and 182. In the exemplary embodiment of FIG. 1, the liquid crystal molecules 210 are initially tilted in a direction parallel to the first direction D1.

Referring to FIG. 6, the liquid crystal molecules 210 in the first domain region DM1 may be tilted to form a first angle $\theta1$ with respect to the first direction D1. The liquid crystal molecules 210 in the second domain region DM2 may be tilted to form a second angle $\theta2$ with respect to the first direction D1. The liquid crystal molecules 210 in the third domain region DM3 may be tilted to form a third angle $\theta3$ with respect to the first direction D1.

The area A may correspond to a lower left portion of the display region 11, as illustrated in FIG. 5. When an electric field is generated in the display region 11, the liquid crystal molecules 210 may be tilted toward the center of the display region 11 in which the pixel electrode 180 is disposed. Thus, in the area A, the liquid crystal molecules 210 may be tilted to be directed to an upper right direction.

Since a strongest electric field is generated in the first domain region DM1, the long axes of the liquid crystal molecules 210 may be aligned to be parallel to a direction in which the first branch electrodes 181_2 extend. That is, the angle that the direction in which the first branch electrodes 181_2 extend forms with the first direction D1 may be the same as the first angle $\theta1$.

A weaker electric field is generated in the second domain region DM2 than in the first domain region DM1. Thus, the long axes of the liquid crystal molecules 210 generally have a tendency to be aligned in parallel to a direction in which the second branch electrodes 182_4 extend, but may be tilted to be directed to an arbitrary direction between the direction in which the second branch electrodes 182_4 extend and the first direction D1, which is the initial alignment direction of the liquid crystal molecules 210. Since the direction in which the first branch electrodes 181_2 extend and the direction in which the second branch electrodes 182_4 extend are parallel to each other, the second angle $\theta2$ may be smaller than the first angle $\theta1$.

The third domain region DM3 may be affected not only by the electric fields generated in the first and second domain regions DM1 and DM2, respectively, but also by the directions in which the liquid crystal molecules 210 are tilted in the first and second domain regions DM1 and DM2, respectively. The influence of the first and second domain regions DM1 and DM2 on the third domain region DM3 may be apparent at a high gray level, i.e., when a relatively high voltage is provided to the first sub-pixel electrode 181, and may be limited at a low gray level, i.e., when a relatively low voltage is provided to the first sub-pixel electrode 181. Thus, the liquid crystal molecules 210 in the third domain region DM3 may be tilted in a similar direction to their initial alignment direction. As a result, the third angle $\theta3$ may be smaller than the second angle $\theta2$.

Since the angle that the long axes of the liquid crystal molecules 210 form with the first direction D1 diversifies within the display region 11, the visibility of the LCD device according to the exemplary embodiment of FIG. 1 may be improved.

Figure 7:
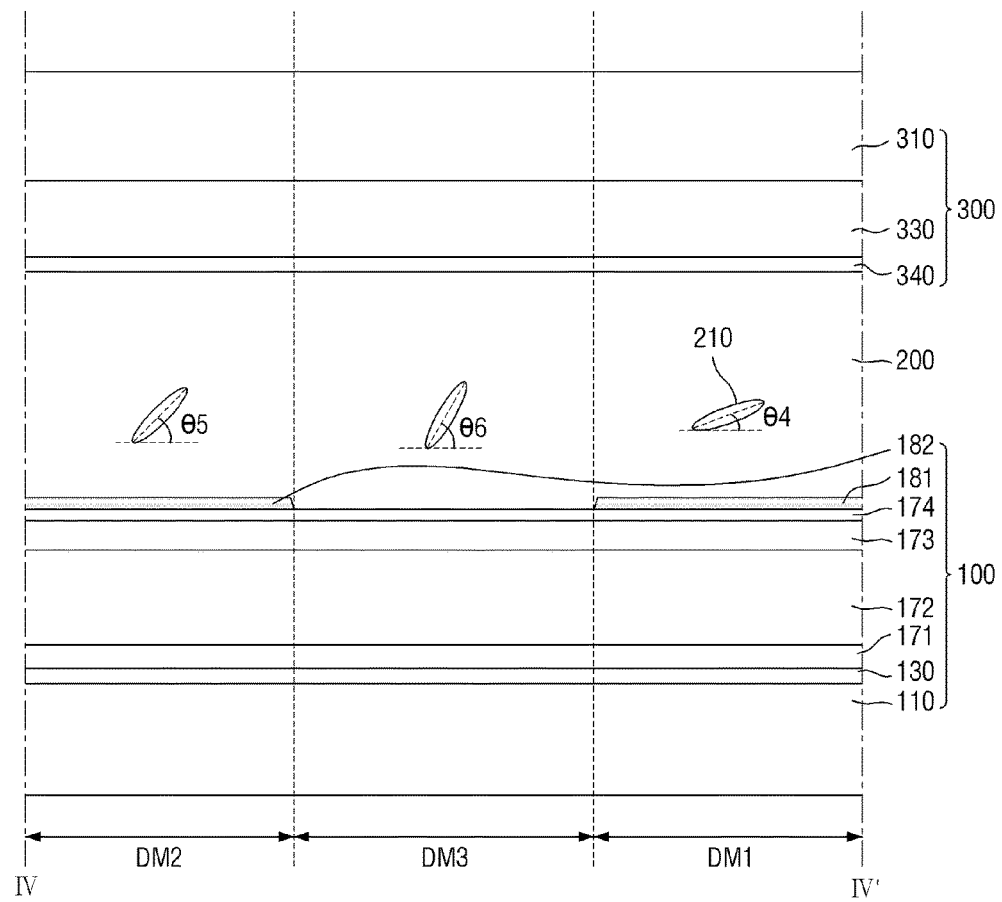
FIG. 7 is a cross-sectional view taken along line IV-IV' of FIG. 6.

FIG. 7 is a cross-sectional view taken along line IV-IV' of FIG. 6.

More specifically, FIG. 7 illustrates a direction in which the liquid crystal molecules 210 in an area along line IV-IV' of FIG. 6 are tilted on a cross-section along a direction perpendicular to the surfaces of the first and second base substrates 110 and 310 in a state in which a predetermined voltage is provided to the surfaces of the first and second sub-pixel electrodes 181 and 182. In the exemplary embodiment of FIG. 1, the liquid crystal molecules 210 are initially tilted in a direction parallel to the first direction D1.

Referring to FIG. 7, the liquid crystal molecules 210 in the first domain region DM1 may be tilted to form a fourth angle θ4 with respect to the surface of the first base substrate 110, the liquid crystal molecules 210 in the second domain region DM2 may be tilted to form a fifth angle θ5 with respect to the surface of the first base substrate 110, and the liquid crystal molecules 210 in the third domain region DM3 may be tilted to form a sixth angle θ6 with respect to the surface of the first base substrate 110. The fifth angle θ5 may be greater than the sixth angle θ6, and the fourth angle θ4 may be greater than the fifth angle θ5. That is, the liquid crystal molecules 210 may be tilted the most in the first domain region DM1 where a strongest electric field is generated and may be tilted the least in the third domain region DM3 where a weakest electric field is generated.

Since the angle that the long axes of the liquid crystal molecules 210 form with the first base substrate 110 diversifies within the display region 11, the visibility of the LCD device according to the exemplary embodiment of FIG. 1 may be improved.

Figure 8:
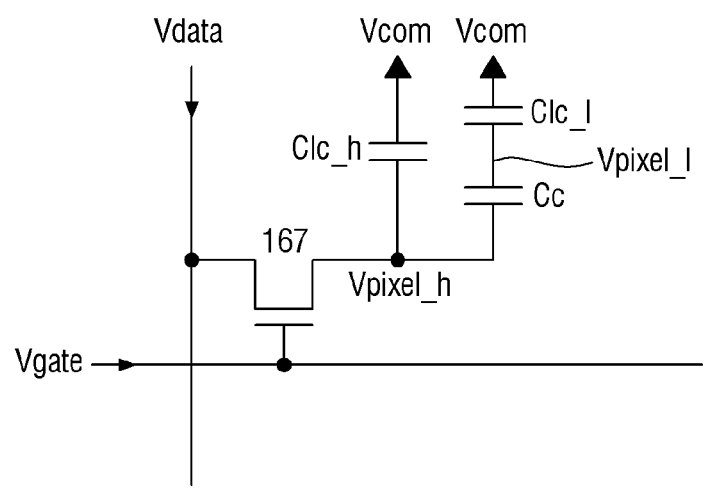
FIG. 8 is an equivalent circuit diagram of the exemplary embodiment of a pixel of the LCD device of FIG. 1.

FIG. 8 is an equivalent circuit diagram of the LCD device according to the exemplary embodiment of FIG. 1.

Referring to FIG. 8, a first liquid crystal capacitor Clc_h represents liquid crystal capacitance provided between the first sub-pixel electrode 181 and the common electrode 340, a second liquid crystal capacitor Clc_1 represents liquid crystal capacitance provided between the second sub-pixel electrode 182 and the common electrode 340, and a coupling capacitor Cc represents coupling capacitance provided between the first and second coupling electrodes 125 and 168.

A voltage provided to the common electrode 340 may be a common voltage Vcom. When a voltage applied to the first sub-pixel electrode 181 in response to the common voltage Vcom is defined as a first sub-pixel voltage Vpixel_h and a voltage applied to the second sub-pixel electrode 182 in response to the common voltage Vcom is defined as a second sub-pixel voltage Vpixel_1, the first sub-pixel voltage Vpixel_h satisfies the following equation in accordance with a following voltage divider equation:

$Vpixel\_h = Vpixel\_1 * (Clc\_h/(Clc\_h + Clc\_1))$      <voltage divider equation>

Since Clc_h/(Clc_h+Clc_1) is always less than 1, the second sub-pixel voltage Vpixel_1 is always lower than the first sub-pixel voltage Vpixel_h. By controlling the capacitance of the coupling capacitor Cc, the ratio of the second sub-pixel voltage Vpixel_1 to the first sub-pixel voltage Vpixel_h may be controlled. The capacitance of the coupling capacitor Cc may be controlled by controlling the overlapping area between the first and second coupling electrodes 125 and 168 or the distance between the first and second coupling electrodes 125 and 168.

Figure 9:
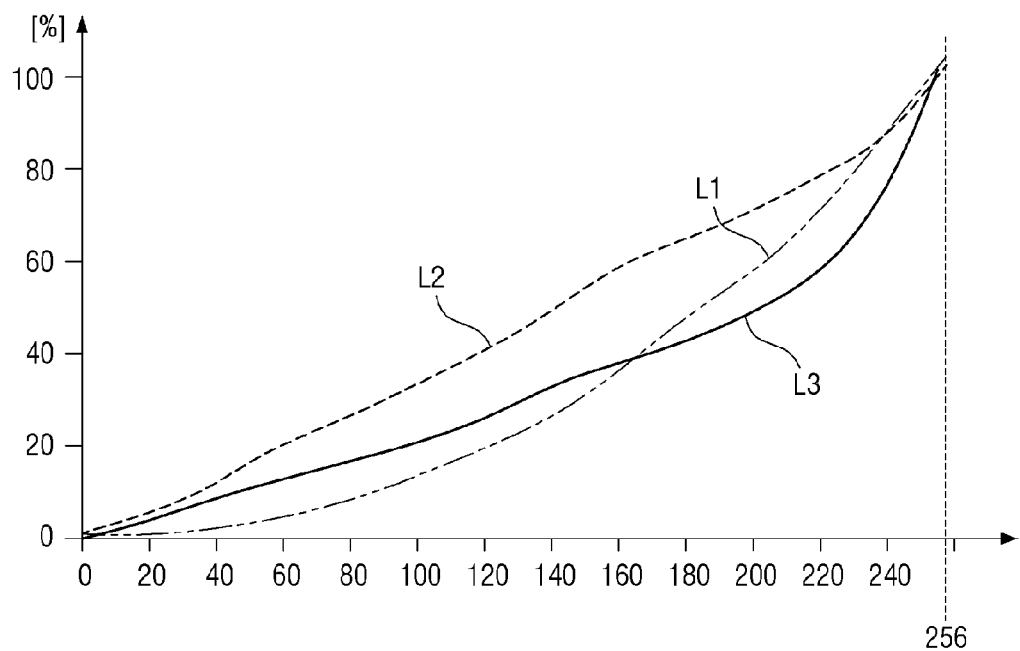
FIG. 9 is a graph showing the improvement of the exemplary embodiment of the LCD device of FIG. 1.

FIG. 9 is a graph showing the improvement of the visibility of the LCD device according to the exemplary embodiment of FIG. 1.

Referring to FIG. 9, the X axis represents a gray level, and the Y axis represents an actual brightness as viewed by a user. A maximum brightness represented by the Y axis is 100%. A maximum brightness of 100% is defined as the brightness of an LCD device having a gray level of 255, among a plurality of gray levels ranging from 0 to 255, as viewed from the front of the LCD device.

As shown in FIG. 9, a first line L1 represents the brightness, for each gray level, of the LCD device according to the exemplary embodiment of FIG. 1, as viewed from the front of the LCD device according to the exemplary embodiment of FIG. 1, a second line L2 represents the brightness, for each gray level, of an LCD device according to a comparative example, as viewed from a side of the LCD device according to a comparative example, and a third line L3 represents the brightness, for each gray level, of the LCD device according to the exemplary embodiment of FIG. 1, as viewed from a side of the LCD device according to the exemplary embodiment of FIG. 1.

As used herein, the expression "viewed from the front" denotes a case in which an LCD device is viewed from a point on a straight line extending perpendicularly from the center of the first display substrate 100, and the expression "viewed from a side" denotes a case in which an LCD device is viewed from a point on a straight line extending from the center of the first display substrate 100 at an angle of 30° with respect to a normal direction to the surface of the first display substrate 100. The LCD device according to a comparative example is an LCD device in which two TFTs 167 are provided and driven in each pixel 10.

The gap between the third line L3 and the first line L1 is smaller than the gap between the second line L2 and the first line L1 in most of the gray level range, particularly, in the range of gray levels of 0 to 210. That is, the discrepancy between the side and front brightnesses of the LCD according to the exemplary embodiment of FIG. 1 is smaller than the discrepancy between the side and front brightnesses of the LCD according to a comparative example. In general, the discrepancy between the front and side brightnesses of an LCD device is evident in the range of low gray levels of 0 to 210. Thus, it is apparent that the LCD device according to the exemplary embodiment of FIG. 1 has an improved visibility at a low gray level, compared to the LCD device according to a comparative example.

Figure 10:
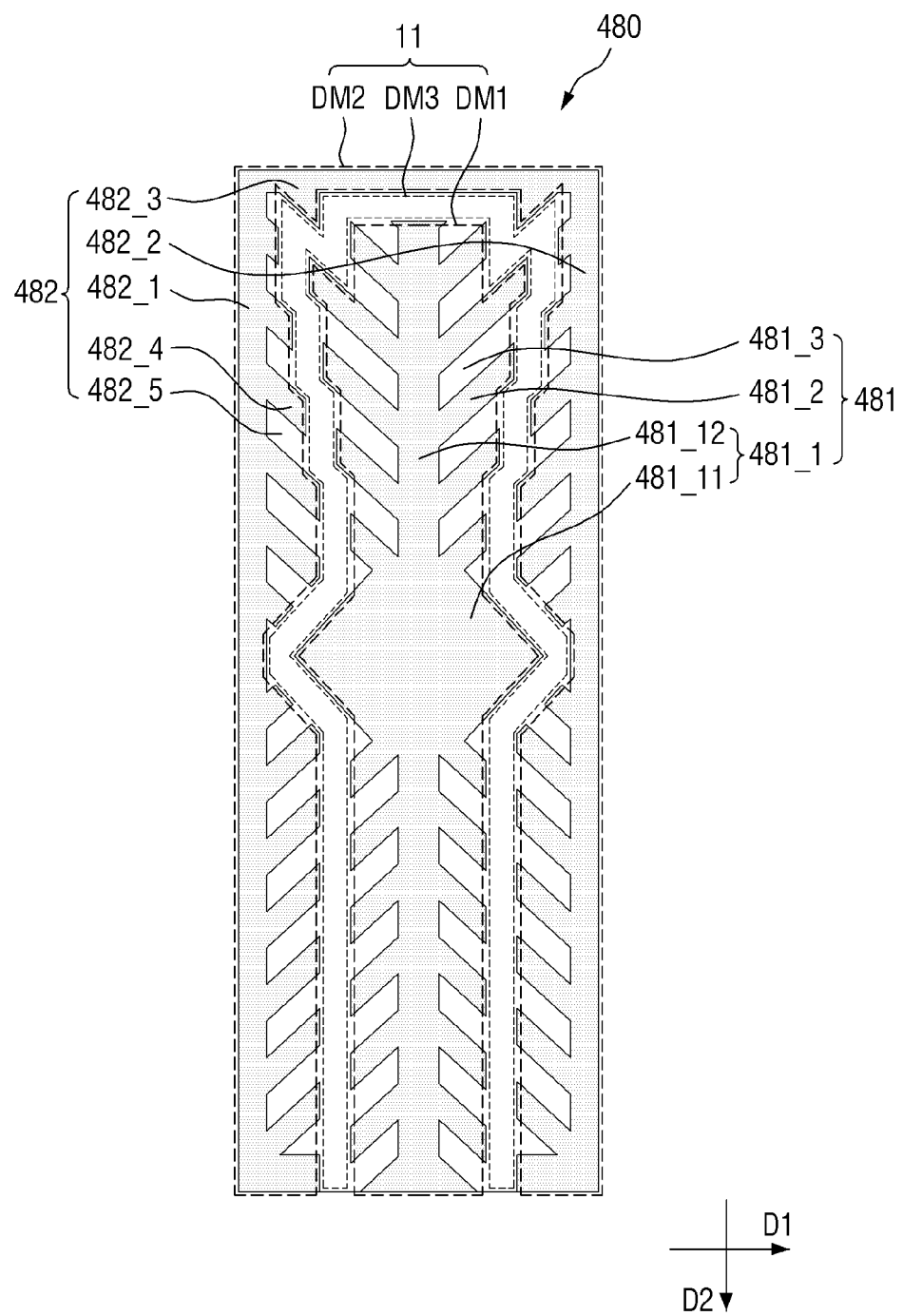
FIG. 10 is a plan view of another exemplary embodiment of a pixel electrode of an LCD device according to the invention.

FIG. 10 is a plan view of a pixel electrode of an LCD device according to another exemplary embodiment of the invention.

In FIGS. 1 through 10, like reference numerals indicate like elements, and thus, descriptions thereof will be omitted or simplified. The exemplary embodiment of FIG. 10 will hereinafter be described, focusing mainly on differences with the exemplary embodiment of FIG. 1.

Referring to FIG. 10, in a pixel electrode 480, first branch electrodes 481_2 of a first sub-pixel electrode 481 may have different lengths, and second branch electrodes 482_4 of a second sub-pixel electrode 482 may also have different lengths, whereas in the pixel electrode 180 of FIG. 5, the length of the first branch electrodes 181_2 and the length of the second branch electrodes 182_4 are generally uniform. In the exemplary embodiment, a first stem extension 481_12 of a first stem electrode 481_1 and first minute slits 481_3 may be similar to the first stem extension 181_12 of the first stem electrode 181_1 and the first minute slits 181_3 (refer to FIG. 5), and second, third, and fourth stem electrodes 482_1, 482_2 and 482_3 and second minute slits 482_5 of the second sub-pixel electrode 482 may be similar to the second, third, and fourth stem electrodes 182_1, 182_2 and 182_3 and the second minute slits 182_5 (refer to FIG. 5).

More specifically, some of the first branch electrodes 481_2 may extend longer, further away from a first stem expanded portion 481_11, and some of the second branch electrodes 482_4 may extend shorter, further away from the first stem expanded portion 481_11.

Accordingly, a first domain region DM1 may be widened, and a third domain region DM3 may be narrowed, compared to the first and third domain regions DM1 and DM3 of the pixel electrode 180 of FIG. 5. That is, by controlling the length of the first branch electrodes 481_2 and the length of the second branch electrodes 482_4, the areas of the first, second, and third domain regions DM1, DM2, and DM3 may be controlled.

The length of the first branch electrodes 481_2 and the length of the second branch electrodes 482_4 are not limited to the exemplary embodiment of FIG. 10. That is, in an alternative exemplary embodiment, some of the first branch electrodes 481_2 may extend shorter, further away from a first stem expanded portion 481_11, and some of the second branch electrodes 482_4 may extend longer, further away from the first stem expanded portion 481_11. In this alternative example, the first domain region DM1 may be further narrowed, and the third domain region DM3 may be further widened, compared to the first and third domain regions DM1 and DM3 of the pixel electrode 180 of FIG. 5.

Figure 11:
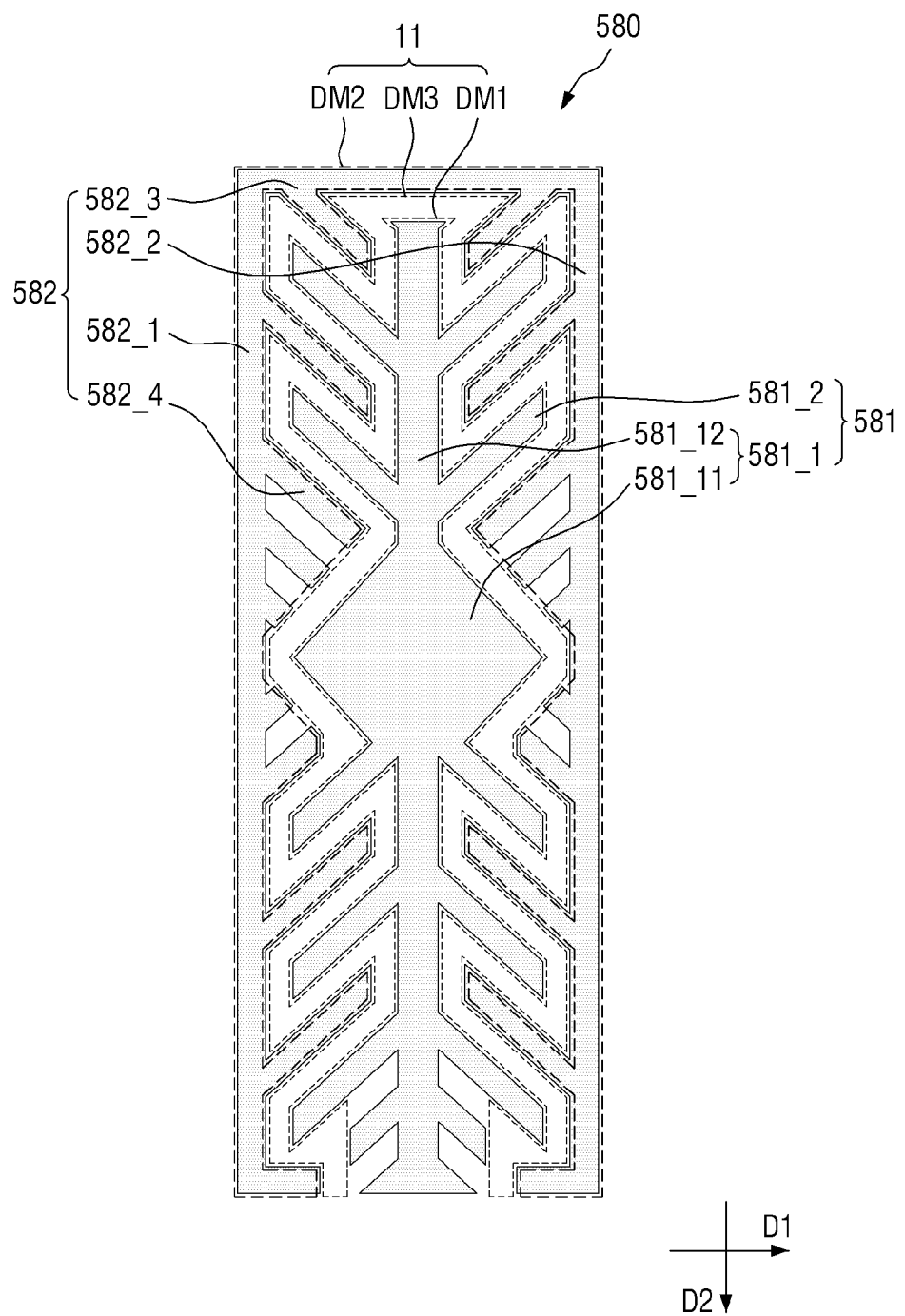
FIG. 11 is a plan view of another exemplary embodiment of a pixel electrode of an LCD device according to the invention.

FIG. 11 is a plan view of a pixel electrode of an LCD device according to another exemplary embodiment of the invention.

Referring to FIG. 11, in a pixel electrode 580, each pair of a first branch electrode 581_2 of a first sub-pixel electrode 581 and a second branch electrode 582_4 of a second sub-pixel electrode 582 adjacent to each other may be disposed to extend and not overlap each other, whereas in the pixel electrode 180 of FIG. 5, the second branch electrodes 182_4 are disposed on the extension lines of the first branch electrodes 181_2, respectively.

In the exemplary embodiment, a first stem expanded portion 581_11 and a first stem extension 581_12 of a first stem electrode 581_1 may be similar to the first stem expanded portion 181_11 and the first stem extension 181_12 of the first stem electrode 181_1 (refer to FIG. 5), and second, third, and fourth stem electrodes 582_1, 582_2 and 582_3 may be similar to the second, third, and fourth stem electrodes 182_1, 182_2 and 182_3 (refer to FIG. 5).

Since the first branch electrodes 581_2 and the second branch electrodes 582_4 are alternately arranged to engage with each other, the area in which the first branch electrodes 581_2 and the second branch electrodes 582_4 face each other may be widened. Thus, a second domain region DM2 may be relatively widened, and first and third domain regions DM1 and DM3 may be relatively narrowed.

Figure 12:
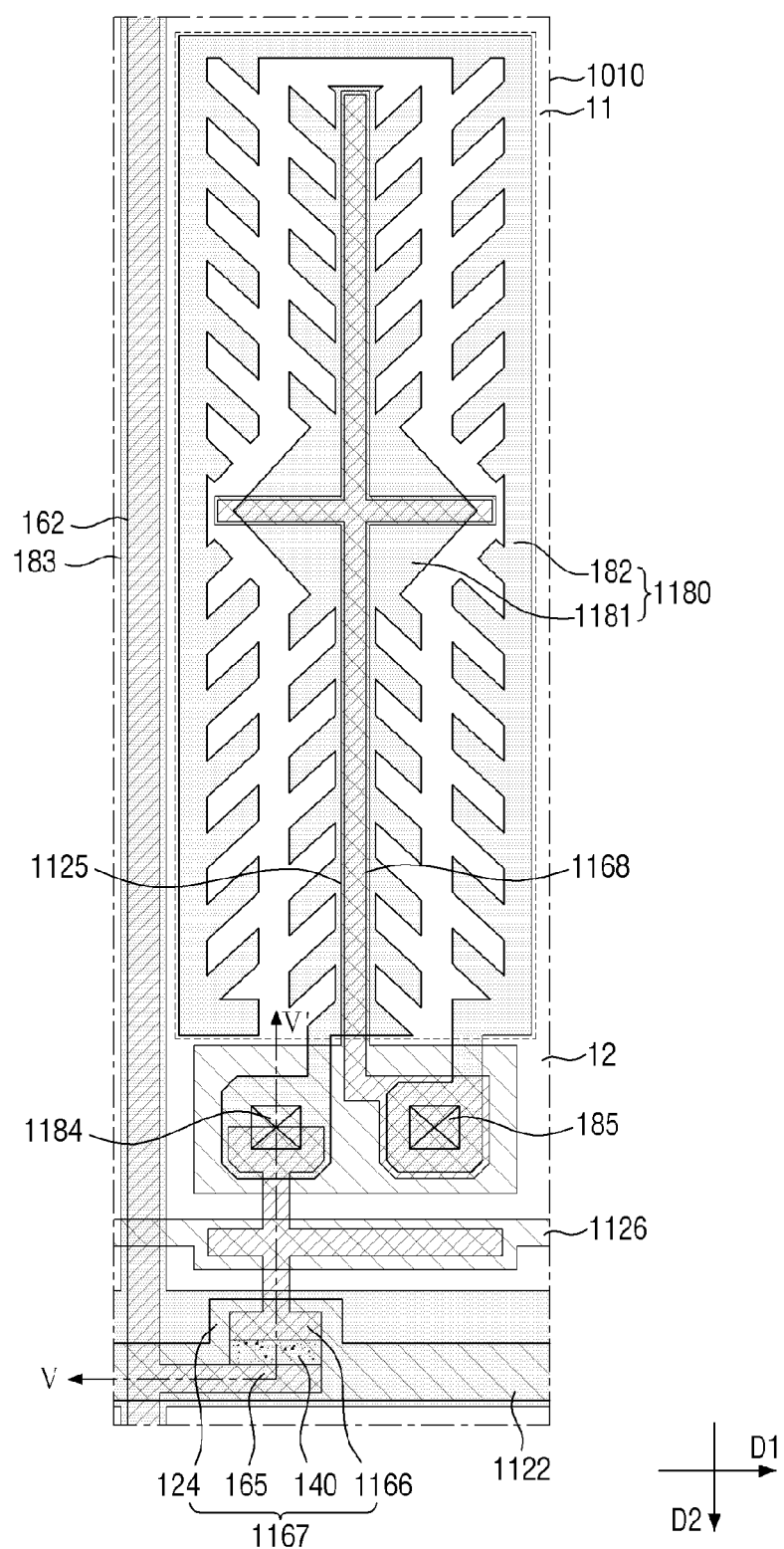
FIG. 12 is a plan view of another exemplary embodiment of a pixel of an LCD device according to the invention.
Figure 13:
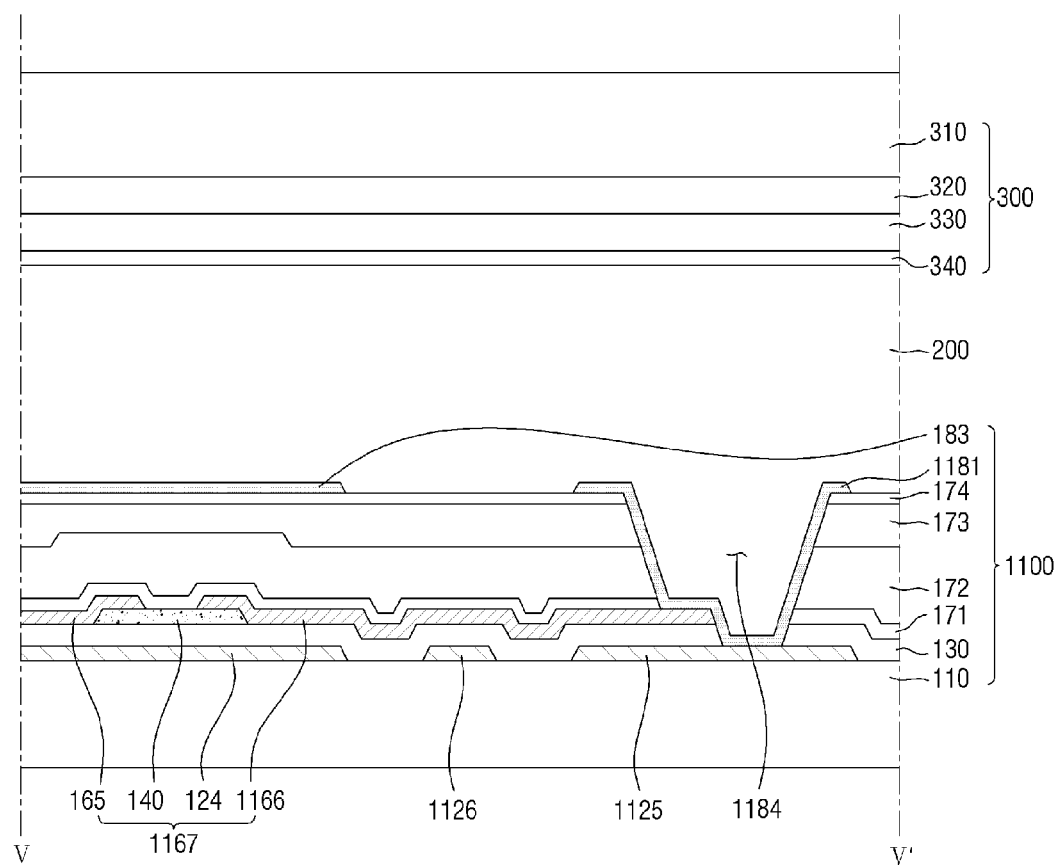
FIG. 13 is a cross-sectional view taken along line V-V' of FIG. 12.

FIG. 12 is a plan view of a pixel of an LCD device according to another exemplary embodiment of the invention, and FIG. 13 is a cross-sectional view taken along line V-V' of FIG. 12.

Referring to FIGS. 12 and 13, a pixel 1010 of the LCD device according to the exemplary embodiment, unlike the pixel 10 of the LCD device of FIG. 1, further includes a sustain electrode 1126.

The sustain electrode 1126 is disposed on a first base substrate 1110. The sustain electrode 1126 may be disposed in the same layer as that in which a gate line 1122 and a first coupling electrode 1125 are disposed and may include the same material as those of the gate line 1122 and the first coupling electrode 1125. The sustain electrode 1126 may be electrically insulated from the gate line 1122 and the first coupling electrode 1125.

The sustain electrode 1126 may extend substantially in a first direction D1 and may be disposed to be overlapped by part of the output terminal of a TFT 1167, i.e., part of a drain electrode 1166.

The sustain electrode 1126 may form a sustain capacitor with part of the drain electrode 1166 and may have a predetermined capacitance. The sustain electrode 1126 may be provided with a sustain voltage having a predetermined level. The sustain voltage may be generally uniform and may have the same level as a common voltage Vcom.

The drain electrode 1166 is physically and electrically connected to a first sub-pixel electrode 1181 of a pixel electrode 1180 and a first coupling electrode 1125 via a first contact hole 1184 and may thus prevent a rapid drop in the voltage that the first sub-pixel electrode 1181 is charged with. The voltage that the first sub-pixel electrode 1181 is charged with may rapidly drop when the TFT 1167 is turned on or off, and as a result, the display quality of an LCD device may be lowered. The sustain electrode 1126 may prevent such a rapid voltage drop and may thus improve the display quality of an LCD device. In an exemplary embodiment, a second coupling electrode 1168 may be provided to overlap the first coupling electrode 1125.

Figure 14:
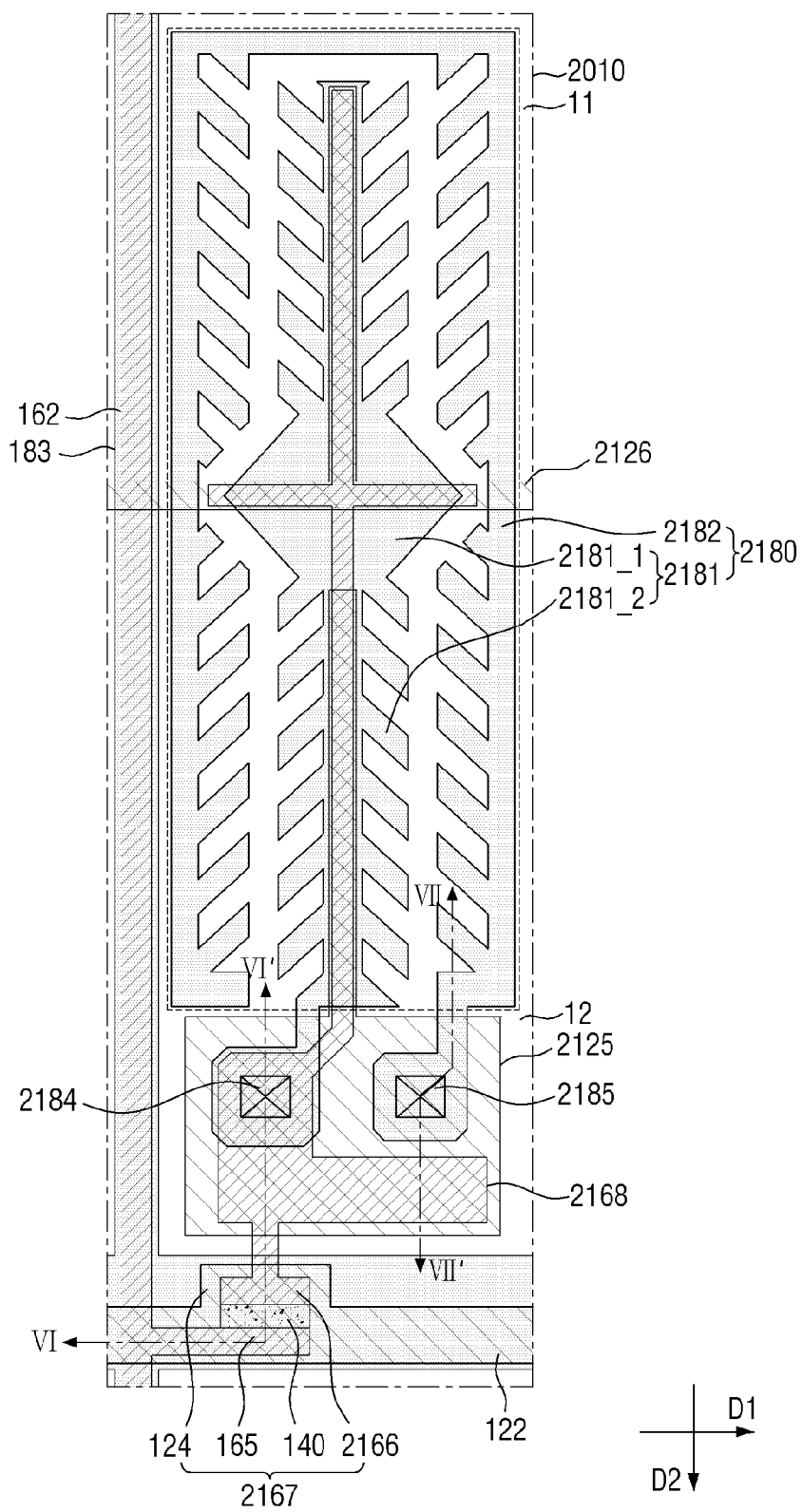
FIG. 14 is a plan view of another exemplary embodiment of a pixel of an LCD device according to the invention.
Figure 15:
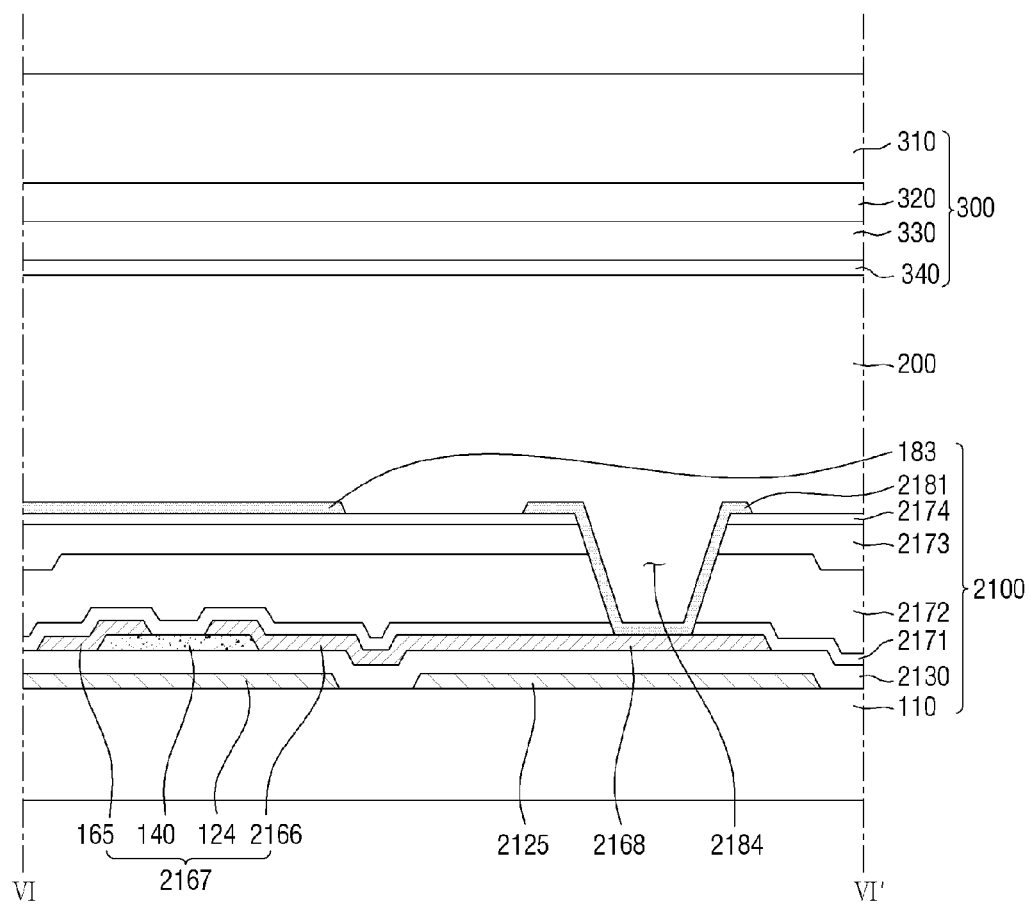
FIG. 15 is a cross-sectional view taken along line VI-VI' of FIG. 14.
Figure 16:
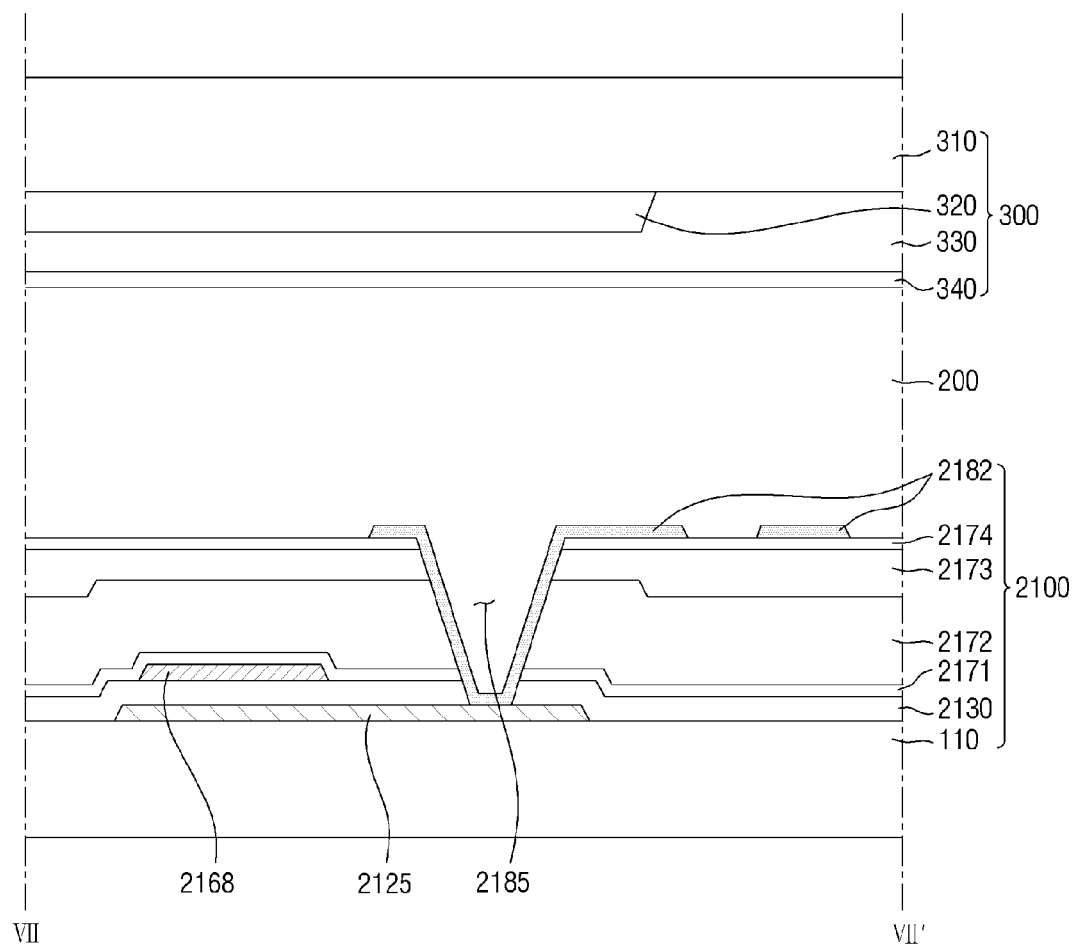
FIG. 16 is a cross-sectional view taken along line VII-VII' of FIG. 14.

FIG. 14 is a plan view of a pixel of an LCD device according to another exemplary embodiment of the invention, FIG. 15 is a cross-sectional view taken along line VI-VI' of FIG. 14, and FIG. 16 is a cross-sectional view taken along line VII-VII' of FIG. 14.

Referring to FIGS. 14 through 16, a pixel 2010 of the LCD device according to the exemplary embodiment differs from the pixel 10 of the LCD device of FIGS. 1 through 4 in that it further includes a sustain electrode 2126. The pixel 2010 also differs from the pixel 10 in elements connected by first and second contact holes 2184 and 2185 and the shape of first and second coupling elements 2125 and 2168.

More specifically, the first coupling electrode 2125 extends in a second direction D2 within a display region 2011 and is disposed to be overlapped by part of a first stem electrode 2181_1. The overlapping area between the first and second coupling electrodes 2125 and 2168 in the display region 2011 may be reduced, compared to the exemplary embodiment of FIGS. 1 through 4. Instead, the area of the first and second coupling electrodes 2125 and 2168 in a region other than the display region 2011 may be increased. That is, regions in which the first and second coupling electrodes 2125 and 2168 overlap each other may be additionally provided between a TFT 2167 and the first and second contact holes 2184 and 2185.

Part of the first stem electrode 2181_1 not overlapping the first coupling electrode 2125 may be disposed to overlap the sustain electrode 2126. The sustain electrode 2126 may extend substantially in a first direction D1, but may also extend in a second direction D2, which is a direction in which the first stem electrode 2181_1 extends, in an area overlapping the first stem electrode 2181_1. The second coupling electrode 2168, unlike the first coupling electrode 2125, may be disposed to overlap most of the first stem electrode 2181_1. As a result, the second coupling electrode 2168 and the sustain electrode 2126 may overlap each other.

Thus, the sustain electrode 2126 may form a sustain capacitor in an area overlapping the first coupling electrode 2125.

In the exemplary embodiment, a drain electrode 2166 is connected to the second coupling electrode 2168 and a first sub-pixel electrode 2181 of a pixel electrode 2180 and the first coupling electrode 2125 is electrically connected to the second coupling electrode 2182 of the pixel electrode 2180, whereas in the exemplary embodiment of FIGS. 1 through 4, the drain electrode 166 is electrically connected to the first coupling electrode 125 and the first sub-pixel electrode 181 and the second coupling electrode 168 is electrically connected to the second sub-pixel electrode 182. In the exemplary embodiment, first branch electrodes 2181_2 may be similar to the first branch electrodes 181_2 (refer to FIG. 5)

More specifically, the drain electrode 2166 may be electrically connected to the second coupling electrode 2168, and the second coupling electrode 2168 and the first sub-pixel electrode 2181 may be electrically connected via a first contact hole 2184, which penetrates a second passivation layer 2174, a planarization layer 2173, a color filter layer 2172, and a first passivation layer 2171 of a first display substrate 2100. The first coupling electrode 2125 and the second sub-pixel electrode 2182 may be electrically connected via a second contact hole 2185, which penetrates the second passivation layer 2174, the planarization layer 2173, the color filter layer 2172, the first passivation layer 2171, and a gate insulating layer 2130 of a first display substrate 2100.

That is, a voltage provided to the drain electrode 2166 may be directly provided to the first sub-pixel electrode 2181 via the second coupling electrode 2168. A predetermined percentage of the voltage provided to the drain electrode 2166 may be induced to the first coupling electrode 2125, and the voltage induced to the first coupling electrode 2125 may be provided to the second sub-pixel electrode 2182.

Figure 17:
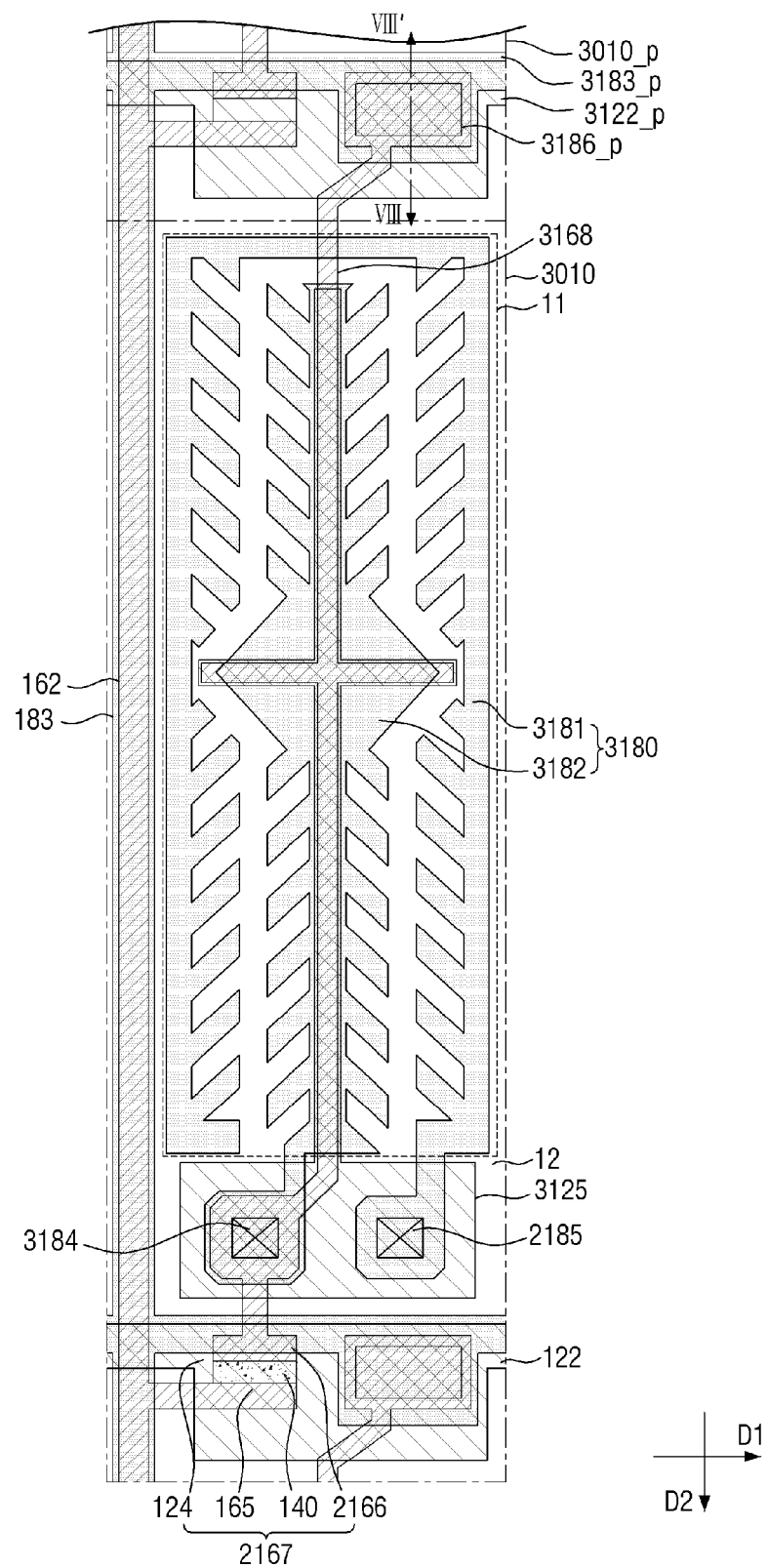
FIG. 17 is a plan view of another exemplary embodiment of a pixel of an LCD device according to the invention.
Figure 18:
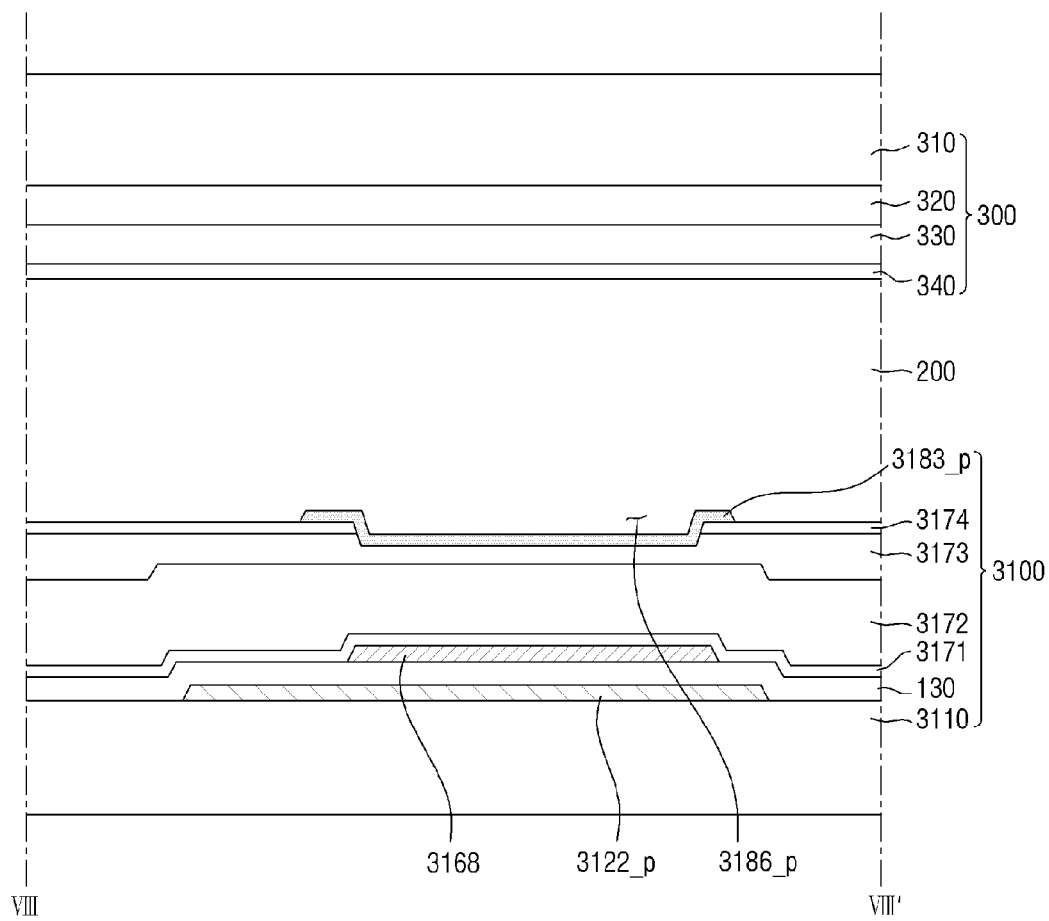
FIG. 18 is a cross-sectional view taken along line VIII-VIII' of FIG. 14.

FIG. 17 is a plan view of a pixel of an LCD device according to another exemplary embodiment of the invention, and FIG. 18 is a cross-sectional view taken along line VIII-VIII' of FIG. 14.

Referring to FIGS. 17 and 18, a pixel 3010 of the LCD device according to the exemplary embodiment differs from the pixel 2010 of FIGS. 14 through 16 in that a second coupling electrode 3168 overlaps a previous gate line 3122_p of a previous pixel 3010_p in a row previous to a row including the pixel 3010.

The second coupling electrode 3168 not only forms a coupling capacitor Cc by being capacitively coupled to a first coupling electrode 3125, but also forms a sustain capacitor by being capacitively coupled to the previous gate line 3122_p of the previous pixel 3010_p.

A previous first recess pattern 3186_p, which is defined to penetrate all or some of a second passivation layer 3174, a planarization layer 3173, and a color filter layer 3172, may be disposed in an overlapping area between the second coupling electrode 3168 and the previous gate line 3122_p of the previous pixel 3010_p. The previous first recess pattern 3186_p may be overlapped by a previous shielding electrode 3183_p of the previous pixel 3010_p. In the exemplary embodiment, a first passivation layer 3171 of a first display substrate 3100 may be disposed on the second coupling electrode 3168_p.

In a case in which the previous shielding electrode 3183_p of the previous pixel 3010_p is disposed to overlap the previous first recess pattern 3186_p, the first coupling electrode 3125 not only forms the sustain capacitor by being capacitively coupled to the previous gate line 3122_p of the previous pixel 3010_p, but also forms a shielding capacitor together with the previous shielding electrode 3183_p of the previous pixel 3010_p.

The more the previous first recess pattern 3186_p is recessed toward a first base substrate 3110, the shorter the distance between the first coupling electrode 3125 and the previous shielding electrode 3183_p of the previous pixel 3010_p becomes, and thus, the larger the capacitance of the shielding capacitor becomes. Thus, by controlling the degree to which the previous first recess pattern 3186_p is recessed toward the first base substrate 3110, the capacitance of the shielding capacitor may be controlled, and as a result, the influence of the sustain capacitor on a first sub-pixel electrode 3181 of a pixel electrode 3180 may be controlled. In the exemplary embodiment, a first contact hole 3184 may be similar to the first contact hole 2184 (refer to FIG. 14)

According to the present exemplary embodiment, the sustain capacitor not only prevents a rapid drop in the voltage that the first sub-pixel electrode 3181 is charged with, but also improves the voltage charge rate of the first sub-pixel electrode 3181, and this will hereinafter be described in detail with reference to FIGS. 19 and 20.

Figure 19:
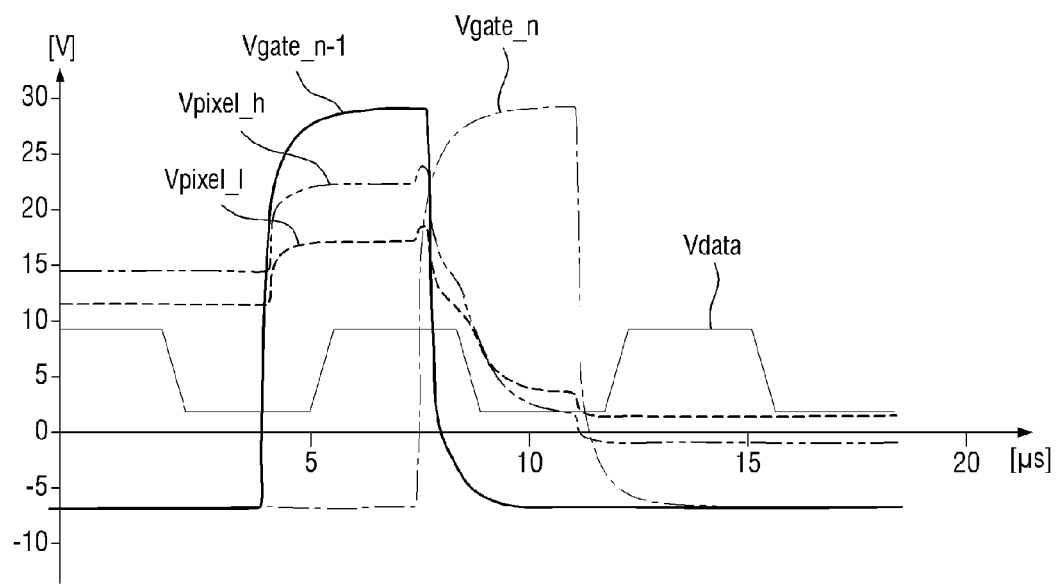
FIGS. 19 and 20 are graphs showing voltages applied to the elements, respectively, of the pixel of FIG. 17 over two consecutive frames.
Figure 20:
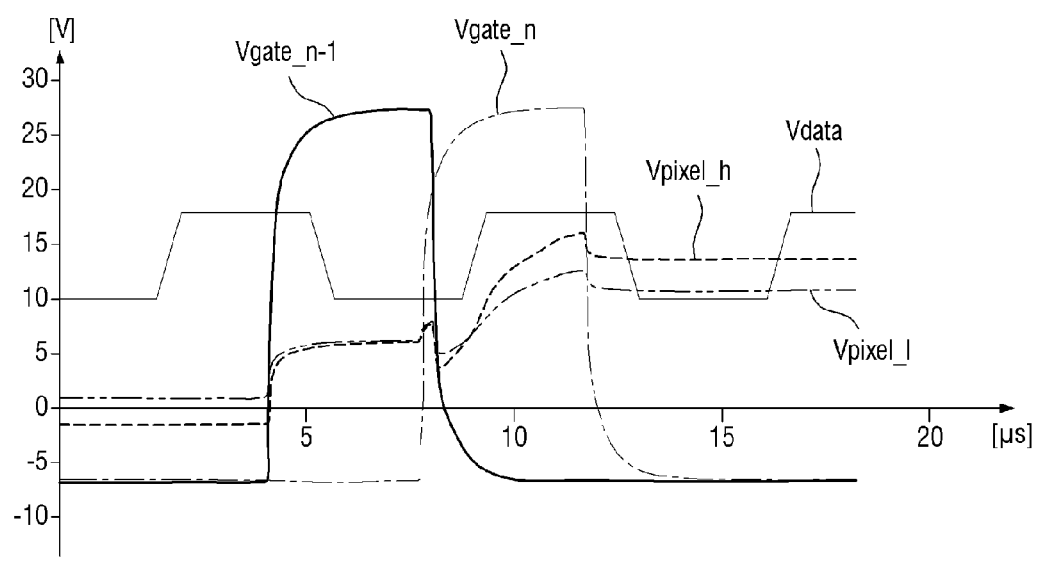

FIGS. 19 and 20 are graphs showing voltages applied to the elements, respectively, of the pixel of FIG. 17.

The LCD device of the exemplary embodiment of FIG. 17 may be driven to change the polarity of a common voltage Vcom for each pixel 3010 to improve display quality. A frame during which first and second sub-pixel voltages Vpixel_h and Vpixel_1 are driven to be higher than the common voltage Vcom is referred to as a positive-polarity frame, and a frame during which the first and second sub-pixel voltages Vpixel_h and Vpixel_1 are driven to be lower than the common voltage Vcom is referred to as a negative-polarity frame.

FIG. 19 is a graph for a frame switching from negative polarity to positive polarity, and FIG. 20 is a graph for a frame switching from positive polarity to negative polarity.

Referring to FIG. 19, in response to a previous gate signal Vgate_n−1 being provided to the previous gate line 3122_p of the previous pixel 3010_p, the voltage of the second coupling electrode 3168 may increase due to the influence of the sustain capacitor, and as a result, the voltage of the first sub-pixel electrode 3181, i.e., the first sub-pixel voltage Vpixel_h, may increase. Also, the voltage of the first coupling electrode 3125 may increase due to the influence of the coupling capacitor Cc, and as a result, the voltage of the second sub-pixel electrode 3182 of the pixel electrode 3180 (refer to FIG. 17), i.e., the second sub-pixel voltage Vpixel_1, may increase.

Thereafter, in response to a gate signal Vgate_n being provided to the gate line 3122 of the pixel 3010, the first and second sub-pixel voltages Vpixel_h and Vpixel_1 may additionally increase. In other words, the first and second sub-pixel voltages Vpixel_h and Vpixel_1 may increase twice. Since the first and second sub-pixel voltages Vpixel_h and Vpixel_1 are slightly raised in advance before they are to be fully raised, the charge rate of the pixel 3010 may be improved.

Referring to FIG. 20, in a negative-polarity frame, like in the positive-polarity frame of FIG. 19, in response to the gate signal Vgate_n−1 being provided to the previous gate line 3122_p of the previous pixel 3010_p, the voltage of the second coupling electrode 3168 may increase due to the influence of the sustain capacitor, and as a result, the voltage of the first sub-pixel electrode 3181, i.e., the first sub-pixel voltage Vpixel_h, may increase. Also, in the negative-polarity frame, like in the positive-polarity frame of FIG. 19, the voltage of the first coupling electrode 3125 may increase due to the influence of the coupling capacitor Cc, and as a result, the voltage of the second sub-pixel electrode 3182, i.e., the second sub-pixel voltage Vpixel_1, may increase.

Thereafter, in response to the gate signal Vgate_n being provided to the gate line 3122 of the pixel 3010, the first and second sub-pixel voltages Vpixel_h and Vpixel_1 may rapidly drop because in a negative-polarity frame, a data signal Vdata having a lower voltage than the common voltage Vcom is provided, whereas in a positive-polarity frame, a data signal Vdata having a higher voltage than the common voltage Vcom is provided.

Since the voltage of the gate signal Vgate_n−1, which is provided to the previous gate line 3122_p of the previous pixel 3010_p, rapidly decreases, a kickback phenomenon may occur in which the first and second sub-pixel voltages Vpixel_h and Vpixel_1 rapidly drop. That is, the first and second sub-pixel voltages Vpixel_h and Vpixel_1 may rapidly drop due to the influence of the previous gate line 3122_p of the previous pixel 3010_p, and may also rapidly drop due to the influence of the data signal Vdata. Since the direction in which the first and second sub-pixel voltages Vpixel_h and Vpixel_1 change is the same for both causes of such rapid drops in the first and second sub-pixel voltages Vpixel_h and Vpixel_1, the charge rate of the pixel 3010 may be improved.

Figure 21:
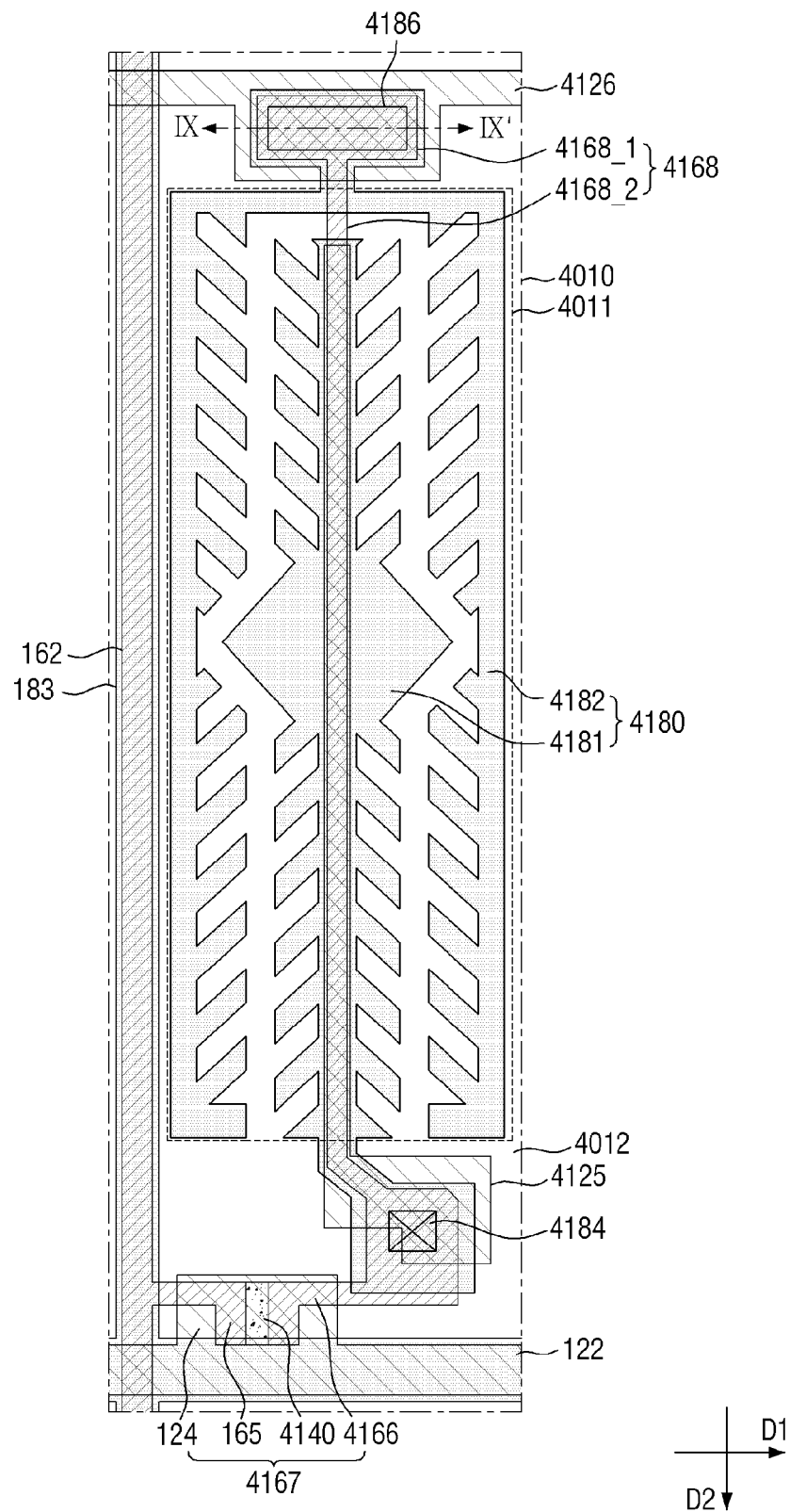
FIG. 21 is a plan view of another exemplary embodiment of a pixel of an LCD device according to the invention.
Figure 22:
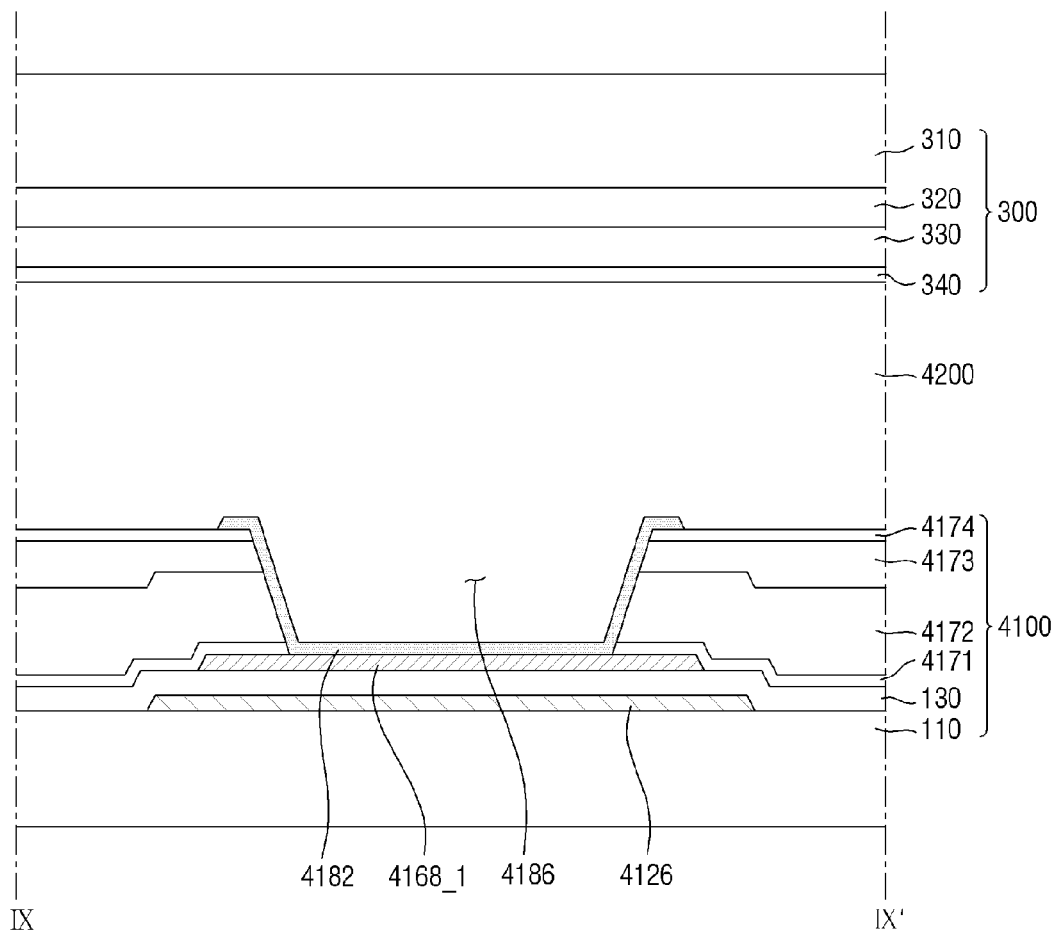
FIG. 22 is a cross-sectional view taken along line IX-IX' of FIG. 21.

FIG. 21 is a plan view of a pixel of an LCD device according to another exemplary embodiment of the invention, and FIG. 22 is a cross-sectional view taken along line IX-IX' of FIG. 21.

Referring to FIGS. 21 and 22, a pixel 4010 of the LCD device according to the exemplary embodiment differs from the pixel 10 of the LCD device of FIGS. 1 through 4 in that it further includes a sustain electrode 4126, includes only a first contact hole 4184, and has a first coupling electrode 4125 in a floating state.

More specifically, the first coupling electrode 4125 may extend in a second direction D2 within a display region 4011 and may be floated without being provided with any particular voltage.

A second coupling electrode 4168 includes a second coupling extension 4168_2 and a second coupling expanded portion 4168_1.

The second coupling extension 4168_2 may extend in the second direction D2 within the display region 4011. In a non-display region 4012, the second coupling extension 4168_2 may be electrically connected to a drain electrode 4166 and may also be electrically connected to a first sub-pixel electrode 4181 of a pixel electrode 4180 via the first contact hole 4184, which penetrates a second passivation layer 4174, a planarization layer 4173, a color filter layer 4172, and a first passivation layer 4171 of a first display substrate 4100.

The second coupling expanded portion 4168_1 may be disposed in a non-display region 4012 and may be capacitively coupled to a second sub-pixel electrode 4182. In the exemplary embodiment, the second coupling expanded portion 4168_1 may be disposed in an upper part of the display region 4011, as illustrated in FIG. 21.

The first coupling electrode 4125 may be disposed to be overlapped by the second coupling electrode 4168. Unlike in the previous exemplary embodiments, the first coupling electrode 4125 may be disposed to be overlapped by the second coupling electrode 4168 mainly for preventing the display quality of the LCD device according to the exemplary embodiment from being lowered because light reflected or scattered from the first coupling electrode 4125 is viewed by a user, rather than for being capacitively coupled to the second coupling electrode 4168. Thus, the first coupling electrode 4125 may be in a floating state. As mentioned above, the first coupling electrode 4125 and a semiconductor layer 4140 of a TFT 4167 may be disposed to contact and overlap each other, and the degree to which light is reflected or scattered by the semiconductor layer 4140 of a TFT 4167 may be greater than the degree to which light is reflected or scattered by the second coupling electrode 4168. In this example, the first coupling electrode 4125 may further prevent the display quality of the LCD device according to the exemplary embodiment from being lowered.

The second sub-pixel electrode 4182 may be disposed to overlap the second coupling expanded portion 4168_1 in a region other than the display region 4011, and the second sub-pixel electrode 4182 and the second coupling electrode 4168 may be capacitively coupled. That is, since the second sub-pixel electrode 4182 and the second coupling electrode 4168 are disposed to overlap each other, a coupling capacitor Cc may be provided between the sub-pixel electrode 4182 and the second coupling electrode 4168, and different voltages may be provided to the first and second sub-pixel electrodes 4181 and 4182 of the pixel electrode 4180.

In order to form a sufficient capacitive coupling between the second coupling expanded portion 4168_1 and the second sub-pixel electrode 4182, a second recess pattern 4186, which penetrates all or some of the second passivation layer 4174, the planarization layer 4173, and the color filter layer 4172, may be provided. The second recess pattern 4168 may be overlapped by the second sub-pixel electrode 4182. Due to the presence of the second recess pattern 4186, the second sub-pixel electrode 4182 may be disposed adjacent to the second coupling expanded portion 4168_1 and may form a sufficient capacitive coupling with the second coupling expanded portion 4168_1.

The sustain electrode 4126 may extend substantially in the second direction D2 and may be provided to be overlapped by the second coupling expanded portion 4168_1. Accordingly, the sustain electrode 4126 may form the sustain capacitor with the second coupling electrode 4168. The second coupling electrode 4168 not only forms the sustain capacitor with the sustain electrode 4126, but also forms the coupling capacitor Cc with the second sub-pixel electrode 182.

Figure 23:
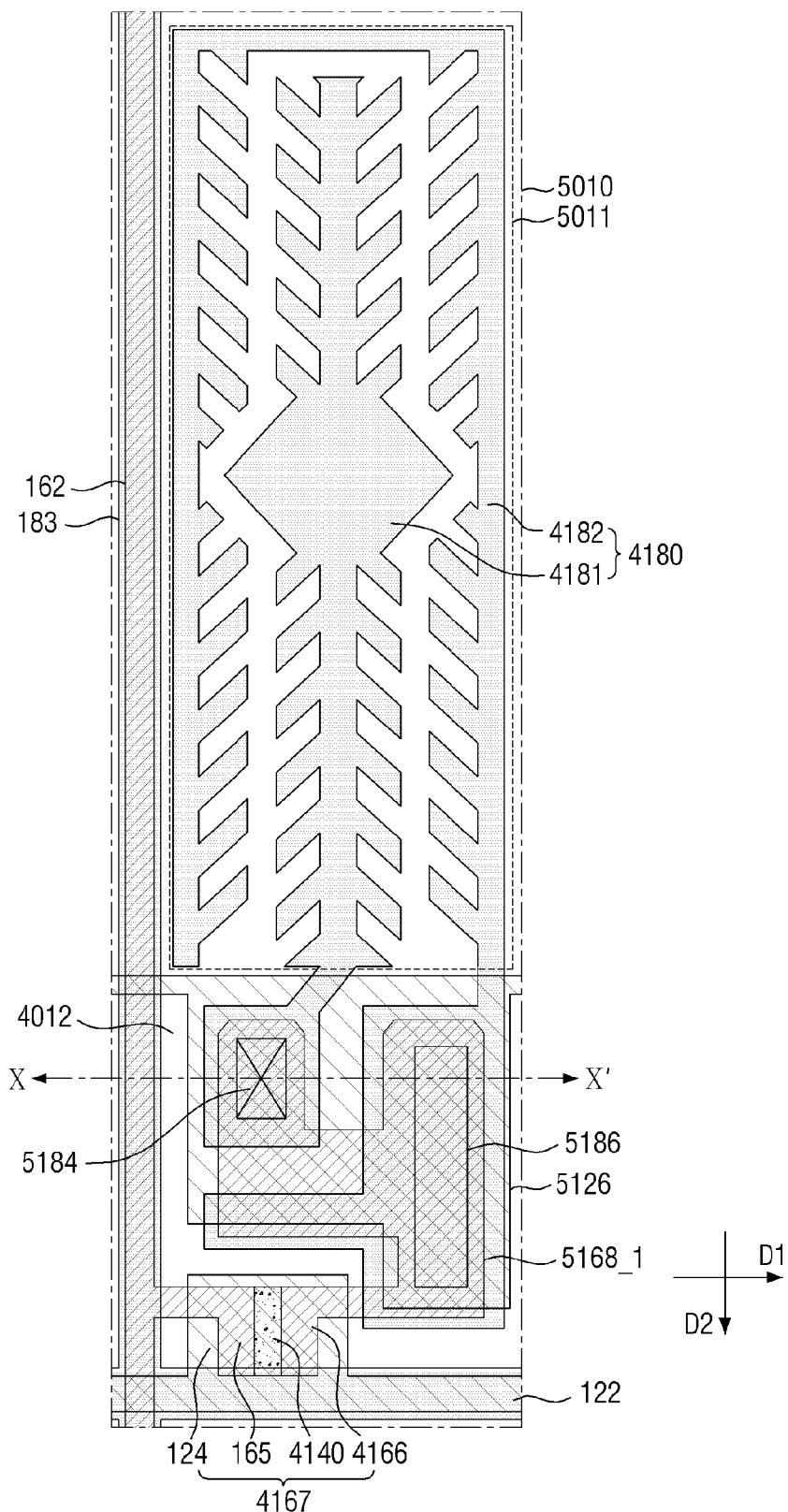
FIG. 23 is a plan view of another exemplary embodiment of a pixel of an LCD device according to the invention.
Figure 24:
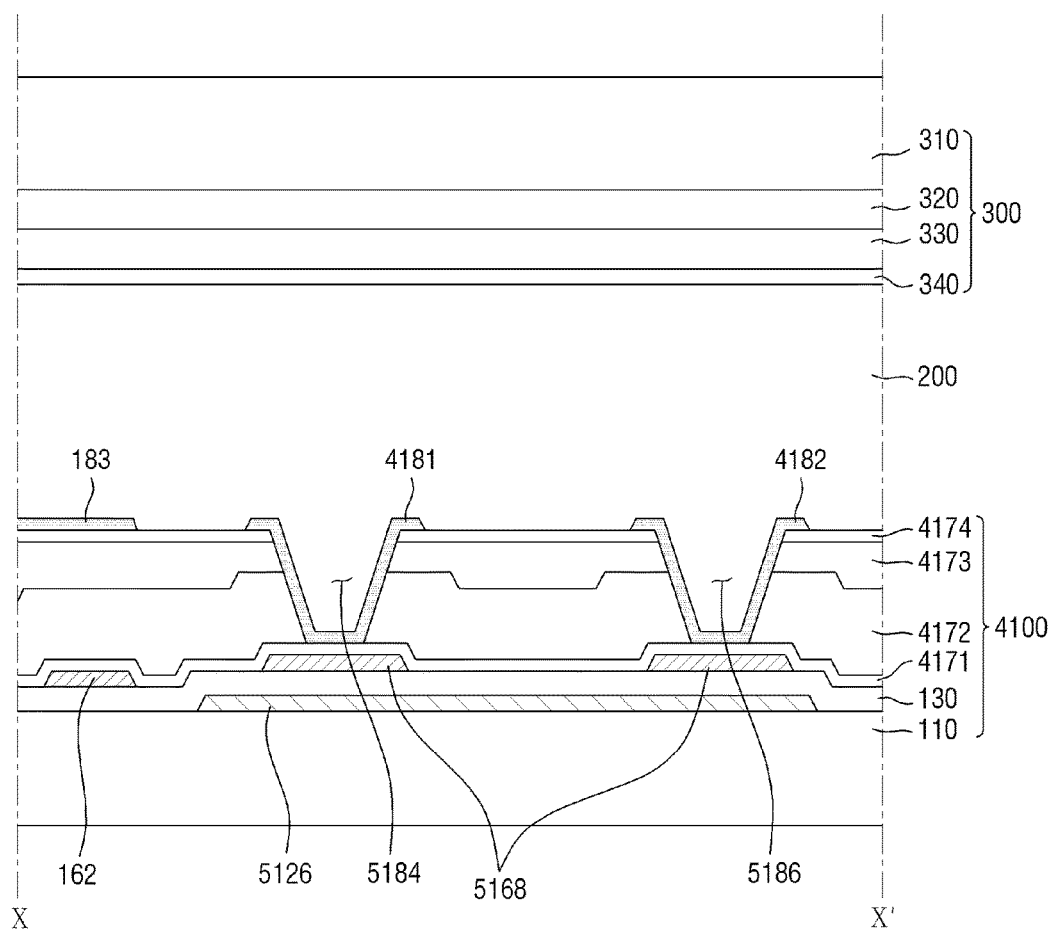
FIG. 24 is a cross-sectional view taken along line X-X' of FIG. 23.

FIG. 23 is a plan view of a pixel of an LCD device according to another exemplary embodiment of the invention, and FIG. 24 is a cross-sectional view taken along line X-X' of FIG. 23.

Referring to FIGS. 23 and 24, in the exemplary embodiment, unlike in the exemplary embodiment of FIGS. 21 and 22, a second coupling expanded portion 5168_1 and a sustain electrode 5126 are disposed in a lower part of a display region 5011. A second recess pattern 5186 may also be disposed in the lower part of the display region 5011.

Since there is no need to transmit signals across the display region 5011 along a second direction D2, no second coupling extension 4168_2 may be provided in the display region 5011. That is, a second coupling extension 4168_2 may be provided only in an area overlapping a first contact hole 5184. Accordingly, a decrease in transmittance that may be caused by a second coupling electrode 5168 may be minimized.

Also, since no second coupling extension 4168_2 is provided, no first coupling electrode 4125 is desired to prevent the reflection or scattering of light by a second coupling extension 4168_2. Thus, a sustain electrode 5126 may be disposed below the second coupling electrode 5168. While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display device, comprising:
   a substrate;
   a first coupling electrode disposed on the substrate;

a first insulating layer disposed on the first coupling electrode;
a second coupling electrode disposed on the first insulating layer and capacitively coupled to the first coupling electrode;
a second insulating layer disposed on the second coupling electrode; and
a pixel electrode including first and second sub-pixel electrodes, which are disposed on the second insulating layer and are electrically insulated from each other, wherein:
the first sub-pixel electrode is electrically connected to the first coupling electrode via a first contact hole defined in the first and second insulating layers;
the second sub-pixel electrode is electrically connected to the second coupling electrode via a second contact hole defined in the second insulating layer, and
the first and second contact holes are defined in a non-display region other than a display region which transmits light therethrough.

2. The liquid crystal display device of claim 1, further comprising:
a gate line which is disposed in the same layer as that in which the first coupling electrode is disposed, and extending in a first direction over the substrate; and
a data line disposed in the same layer as that in which the second coupling electrode is disposed, and extending in a second direction, which intersects the first direction, over the substrate.

3. The liquid crystal display device of claim 2, further comprising:
a thin-film transistor disposed on the substrate and including an input terminal connected to the data line, an output terminal connected to the first sub-pixel electrode and the first coupling electrode, and a control terminal connected to the gate line.

4. The liquid crystal display device of claim 3, wherein the output terminal of the thin-film transistor, the first coupling electrode, and the first sub-pixel electrode are connected to one another via the first contact hole.

5. The liquid crystal display device of claim 4, wherein:
the first contact hole includes a first height portion, which has a first height from a top surface of the substrate, and a second height portion, which has a second height from the top surface of the substrate;
the first height portion overlaps the first coupling electrode, the output terminal of the thin-film transistor, and the first sub-pixel electrode; and
the second height portion overlaps the first coupling electrode and the first sub-pixel electrode.

6. The liquid crystal display device of claim 5, wherein:
in the first height portion, the output terminal of the thin-film transistor and the first sub-pixel electrode contact each other; and
in the second height portion, the first coupling electrode and the first sub-pixel electrode contact each other.

7. The liquid crystal display device of claim 3, further comprising:
a sustain electrode disposed in the same layer as that in which the gate line and the first coupling electrode are disposed, electrically insulated from the gate line and the first coupling electrode, are disposed, and capacitively coupled to the output terminal of the thin-film transistor.

8. The liquid crystal display device of claim 2, wherein the first and second contact holes are defined adjacent to each other in the first direction.

9. The liquid crystal display device of claim 8, wherein, in a plan view of the substrate, the first and second contact holes are defined between the pixel electrode and the gate line.

10. The liquid crystal display device of claim 1, wherein the second contact hole is defined to overlap the first coupling electrode.

11. The liquid crystal display device of claim 1, wherein the first and second coupling electrodes are disposed not to overlap the second sub-pixel electrode.

12. The liquid crystal display device of claim 1, wherein the first and second sub-pixel electrodes are disposed in the same layer and do not overlap each other.

13. The liquid crystal display device of claim 1, wherein:
the first sub-pixel electrode includes a first stem electrode, which extends in a second direction which intersects a first direction, and a plurality of first branch electrodes, which extend from the first stem electrode along a diagonal direction with respect to the first and second directions; and
the second sub-pixel electrode includes second and third stem electrodes, which extend in the second direction, a fourth stem electrode, which extends in the first direction and connects the second and third stem electrodes, and a plurality of second branch electrodes, which extend from the second, third, or fourth stem electrode along the diagonal direction with respect to the first and second directions.

14. The liquid crystal display device of claim 1, wherein:
a plurality of pixels each of which includes the first coupling electrode, the second coupling electrode, the first sub-pixel electrode and the second sub-pixel electrode and in which the first contact hole and the second contact hole are defined is disposed on the substrate;
the display region has a rectangular shape; and
the first and second contact holes are adjacent to each other in a first direction.

15. The liquid crystal display device of claim 14, further comprising:
a signal line disposed in the same layer as that in which the first coupling electrode is disposed, isolated from the first coupling electrode, is disposed and extending in the first direction,
wherein, in a plan view of the substrate, the first and second contact holes are defined between the display region and the signal line.

16. The liquid crystal display device of claim 14, wherein an area in which the first and second coupling electrodes overlap within the display region is cross-shaped.

17. A liquid crystal display device, comprising:
a substrate;
a first coupling electrode disposed on the substrate;
a first insulating layer disposed on the first coupling electrode;
a second coupling electrode disposed on the first insulating layer and capacitively coupled to the first coupling electrode;
a second insulating layer disposed on the second coupling electrode; and
a pixel electrode including first and second sub-pixel electrodes, which are disposed on the second insulating layer and are electrically insulated from each other, wherein:
the first sub-pixel electrode is electrically connected to the second coupling electrode via a first contact hole, which is defined in the second insulating layer;

the second sub-pixel electrode is electrically connected to the first coupling electrode via a second contact hole, which is defined in the first and second insulating layers, and the first and second contact holes are defined in a non-display region other than a display region which transmits light therethrough.

18. The liquid crystal display device of claim 17, further comprising:
- a gate line disposed in the same layer as that in which the first coupling electrode is disposed, and extending in a first direction over the substrate;
- a data line disposed in the same layer as that in which the second coupling electrode is disposed, and extending in a second direction, which intersects the first direction, over the substrate; and
- a thin-film transistor disposed on the substrate and including an input terminal connected to the data line, an output terminal connected to the second coupling electrode, and a control terminal connected to the gate line.

19. The liquid crystal display device of claim 18, further comprising:
- a sustain electrode disposed in the same layer as that in which the gate line and the first coupling electrode are disposed, electrically insulated from the gate line and the first coupling electrode, and capacitively coupled to the second coupling electrode.

20. The liquid crystal display device of claim 18, wherein:
- a plurality of pixels, which are arranged in a matrix, is disposed on the substrate;
- the thin-film transistor, the first coupling electrode, the second coupling electrode, the first sub-pixel electrode, and the second sub-pixel electrode are disposed in each of the plurality of pixels; and
- the second coupling electrode extends to overlap the gate line, which controls a previous thin-film transistor disposed in a previous pixel in a previous row.

21. The liquid crystal display device of claim 1, further comprising:
- a base substrate including a surface facing the substrate;
- a light-shielding member disposed on the surface of the base substrate;
- a liquid crystal layer disposed between the light-shielding member and the pixel electrode;
- wherein the light-shielding member overlaps the first contact hole and the second contact hole.

22. The liquid crystal display device of claim 1,
wherein a planar shape of the first coupling electrode or a planar shape of the second coupling electrode has a shape of cross.

* * * * *